(12) United States Patent
Sun et al.

(10) Patent No.: US 12,347,158 B2
(45) Date of Patent: Jul. 1, 2025

(54) PRE-TRAINING METHOD, IMAGE AND TEXT RETRIEVAL METHOD FOR A VISION AND SCENE TEXT AGGREGATION MODEL, ELECTRONIC DEVICE, AND STORAGE MEDIUM

(71) Applicant: Beijing Baidu Netcom Science Technology Co., Ltd., Beijing (CN)

(72) Inventors: Yipeng Sun, Beijing (CN); Mengjun Cheng, Beijing (CN); Longchao Wang, Beijing (CN); Xiongwei Zhu, Beijing (CN); Kun Yao, Beijing (CN); Junyu Han, Beijing (CN); Jingtuo Liu, Beijing (CN); Errui Ding, Beijing (CN); Jingdong Wang, Beijing (CN); Haifeng Wang, Beijing (CN)

(73) Assignee: Beijing Baidu Netcom Science Technology Co., Ltd. China, Beijing (CN)

( * ) Notice: Subject to any disclaimer, the term of this patent is extended or adjusted under 35 U.S.C. 154(b) by 349 days.

(21) Appl. No.: 18/192,393

(22) Filed: Mar. 29, 2023

(65) Prior Publication Data
US 2023/0386168 A1    Nov. 30, 2023

(30) Foreign Application Priority Data
May 26, 2022    (CN) .......................... 202210590151.1

(51) Int. Cl.
*G06V 10/42*    (2022.01)
*G06F 16/332*    (2025.01)
(Continued)

(52) U.S. Cl.
CPC ............ *G06V 10/42* (2022.01); *G06F 16/332* (2019.01); *G06F 16/532* (2019.01);
(Continued)

(58) Field of Classification Search
None
See application file for complete search history.

(56) References Cited

U.S. PATENT DOCUMENTS 10,853,407 B2 *  12/2020  Bhardwaj ................. G06T 7/10
12,223,439 B2 *   2/2025  Yuan ...................... G06N 20/00
(Continued)

FOREIGN PATENT DOCUMENTS

CN    109299216 A       2/2019
CN    112200031 A  *    1/2021 ......... G06K 9/00362
(Continued)

OTHER PUBLICATIONS

Bai, Xiang, et al. "Integrating scene text and visual appearance for fine-grained image classification." IEEE Access 6, pp. 66322-66335 (Year: 2018).*

(Continued)

*Primary Examiner* — Scott A Rogers
(74) *Attorney, Agent, or Firm* — ArentFox Schiff LLP

(57) ABSTRACT

A pre-training method for a Vision and Scene Text Aggregation model includes: acquiring a sample image-text pair; extracting a sample scene text from a sample image; inputting a sample text into a text encoding network to obtain a sample text feature; inputting the sample image and an initial sample aggregation feature into a visual encoding subnetwork and inputting the initial sample aggregation feature and the sample scene text into a scene encoding subnetwork to obtain a global image feature of the sample image and a learned sample aggregation feature; and pre-training the Vision and Scene Text Aggregation model according to the sample text feature, the global image feature of the sample image, and the learned sample aggregation feature.

19 Claims, 9 Drawing Sheets

(51) Int. Cl.
*G06F 16/532* (2019.01)
*G06F 16/583* (2019.01)
*G06F 18/25* (2023.01)
*G06N 3/045* (2023.01)
*G06N 3/08* (2023.01)
*G06V 10/774* (2022.01)
*G06V 10/80* (2022.01)
*G06V 10/82* (2022.01)
*G06F 40/30* (2020.01)

(52) U.S. Cl.
CPC ........ *G06F 16/5846* (2019.01); *G06F 18/253* (2023.01); *G06N 3/045* (2023.01); *G06N 3/08* (2013.01); *G06V 10/774* (2022.01); *G06V 10/806* (2022.01); *G06V 10/82* (2022.01); *G06F 40/30* (2020.01)

(56) References Cited

U.S. PATENT DOCUMENTS

| | | | |
|---|---|---|---|
| 2020/0142994 A1 | | 5/2020 | Jin et al. |
| 2023/0052906 A1* | | 2/2023 | Chen ..................... G06F 40/295 |
| 2024/0119750 A1* | | 4/2024 | Ichinose ................ G16H 50/70 |
| 2024/0419726 A1* | | 12/2024 | Jenni ..................... G06F 16/535 |

FOREIGN PATENT DOCUMENTS

| | | | | |
|---|---|---|---|---|
| CN | 112784092 A | | 5/2021 | |
| CN | 113360700 A | | 9/2021 | |
| CN | 114283430 A | | 4/2022 | |
| CN | 114445831 A | | 5/2022 | |
| CN | 116383440 A | * | 7/2023 | |
| CN | 113127672 B | * | 6/2024 | ......... G06F 16/5846 |
| CN | 118379563 B | * | 9/2024 | |
| CN | 119211665 A | * | 12/2024 | |
| CN | 117689974 B | * | 2/2025 | .......... G06V 10/764 |
| CN | 119580034 A | * | 3/2025 | |
| WO | 2022068195 A1 | | 4/2022 | |

OTHER PUBLICATIONS

Cheng, Mengjun, et al. "Vista: Vision and scene text aggregation for cross-modal retrieval." Proceedings of the IEEE/CVF Conference on Computer Vision and Pattern Recognition, pp. 5184-5193 (Year: 2022).*

Dey, Arka Ujjal, et al. "Beyonf visual semantics: Exploring the role of scene text in image understanding." Pattern Recognition Letters 149, pp. 164-171 (Year: 2021).*

Gao, Difei, et al. "Multi-modal graph neural network for joint reasoning on vision and scene text." Proceedings of the IEEE/CVF conference on computer vision and patter recognition, pp. 12746-12756 (Year: 2020).*

Miyawaki, Shumpei, et al. "Scene-text aware image and text retrieval with dual-encoder." Proceedings of the 60th Annual Meeting of the Association for Computational Linguistics: Student Research Workshop, pp. 422-433 (Year: 2022).*

Song, Sibo, et al. "Vision-language pre-training for boosting scene text detectors." Proceedings of the IEEE/CVF Conference on Computer Vision and Pattern Recognition, pp. 15681-15691 (Year: 2022).*

Yan, Ruijie, et al. "Primitive representation learning for scene text recognition." Proceedings of the IEEE/CVF conference on computer vision and pattern recognition, pp. 284-293 (Year: 2021).*

Search Report dated Oct. 20, 2023 from corresponding Chinese Application No. CN2022105901511.

* cited by examiner

PRE-TRAINING METHOD, IMAGE AND TEXT RETRIEVAL METHOD FOR A VISION AND SCENE TEXT AGGREGATION MODEL, ELECTRONIC DEVICE, AND STORAGE MEDIUM

CROSS-REFERENCE TO RELATED APPLICATION(S)

This application claims priority to Chinese Patent Application No. 202210590151.1 filed May 26, 2022, the disclosure of which is incorporated herein by reference in its entirety.

TECHNICAL FIELD

The present disclosure relates to the technical field of artificial intelligence and, in particular, to the technical fields of deep learning, image processing, and computer vision.

BACKGROUND

With the development of artificial intelligence technology, the forms of retrieval are increasingly diverse. Image and text retrieval is one important retrieval form among existing retrieval forms. The task form of the image and text retrieval may be to select an image most relevant to a given search text from an image library or to select a text most relevant to a given image from a text library. In an image and text retrieval scenario, how to accurately complete a retrieval task is very important.

SUMMARY

The present disclosure provides a pre-training method and apparatus and an image and text retrieval method and apparatus for a Vision and Scene Text Aggregation model.

According to one aspect of the present disclosure, a pre-training method for a Vision and Scene Text Aggregation model is provided, where the Vision and Scene Text Aggregation model includes a text encoding network and a visual scene encoding network, the visual scene encoding network includes a visual encoding subnetwork and a scene encoding subnetwork, and the method includes the steps described below.

A sample image-text pair is acquired, where the sample image-text pair includes a sample image and a sample text.

A sample scene text is extracted from the sample image.

The sample text is inputted into the text encoding network so that a sample text feature is obtained.

The sample image and an initial sample aggregation feature are inputted into the visual encoding subnetwork and the initial sample aggregation feature and the sample scene text are inputted into the scene encoding subnetwork so that a global image feature of the sample image and a learned sample aggregation feature are obtained.

The Vision and Scene Text Aggregation model pre-trained according to the sample text feature, the global image feature of the sample image, and the learned sample aggregation feature.

According to another aspect of the present disclosure, a training method for a Vision and Scene Text Aggregation model is provided. The method includes the steps described below.

A service image-text pair provided by a service party is acquired, where the service image-text pair includes a service image and a service text.

The Vision and Scene Text Aggregation model is finely adjusted by using the service image and the service text as training data, where the Vision and Scene Text Aggregation model is pre-trained based on any pre-training method for the Vision and Scene Text Aggregation model in the present disclosure.

According to another aspect of the present disclosure, an image and text retrieval method for a Vision and Scene Text Aggregation model is provided, where the Vision and Scene Text Aggregation model includes a text encoding network and a visual scene encoding network, the visual scene encoding network includes a visual encoding subnetwork and a scene encoding subnetwork, and the method includes the steps described below.

A target text for retrieval is acquired.

A candidate scene text is extracted from a candidate image of candidate images.

The target text is inputted into the text encoding network so that a target text feature is obtained.

The candidate image and an initial candidate aggregation feature are inputted into the visual encoding subnetwork and the initial candidate aggregation feature and the candidate scene text are inputted into the scene encoding subnetwork so that a global image feature of the candidate image is obtained.

A target image is determined from the candidate images according to the target text feature and the global image feature of the candidate image.

According to another aspect of the present disclosure, an electronic device is provided. The electronic device includes at least one processor and a memory.

The memory is communicatively connected to the at least one processor.

The memory stores an instruction executable by the at least one processor to enable the at least one processor to perform the pre-training method, the training method, or the image and text retrieval method for the Vision and Scene Text Aggregation model according to any embodiment of the present disclosure.

According to another aspect of the present disclosure, a non-transitory computer-readable storage medium is provided. The non-transitory computer-readable storage medium is configured to store a computer instruction for causing a computer to perform the pre-training method, the training method, or the image and text retrieval method for the Vision and Scene Text Aggregation model according to any embodiment of the present disclosure.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the solutions and not to limit the present disclosure. In the drawings.

DETAILED DESCRIPTION

Figure 1:
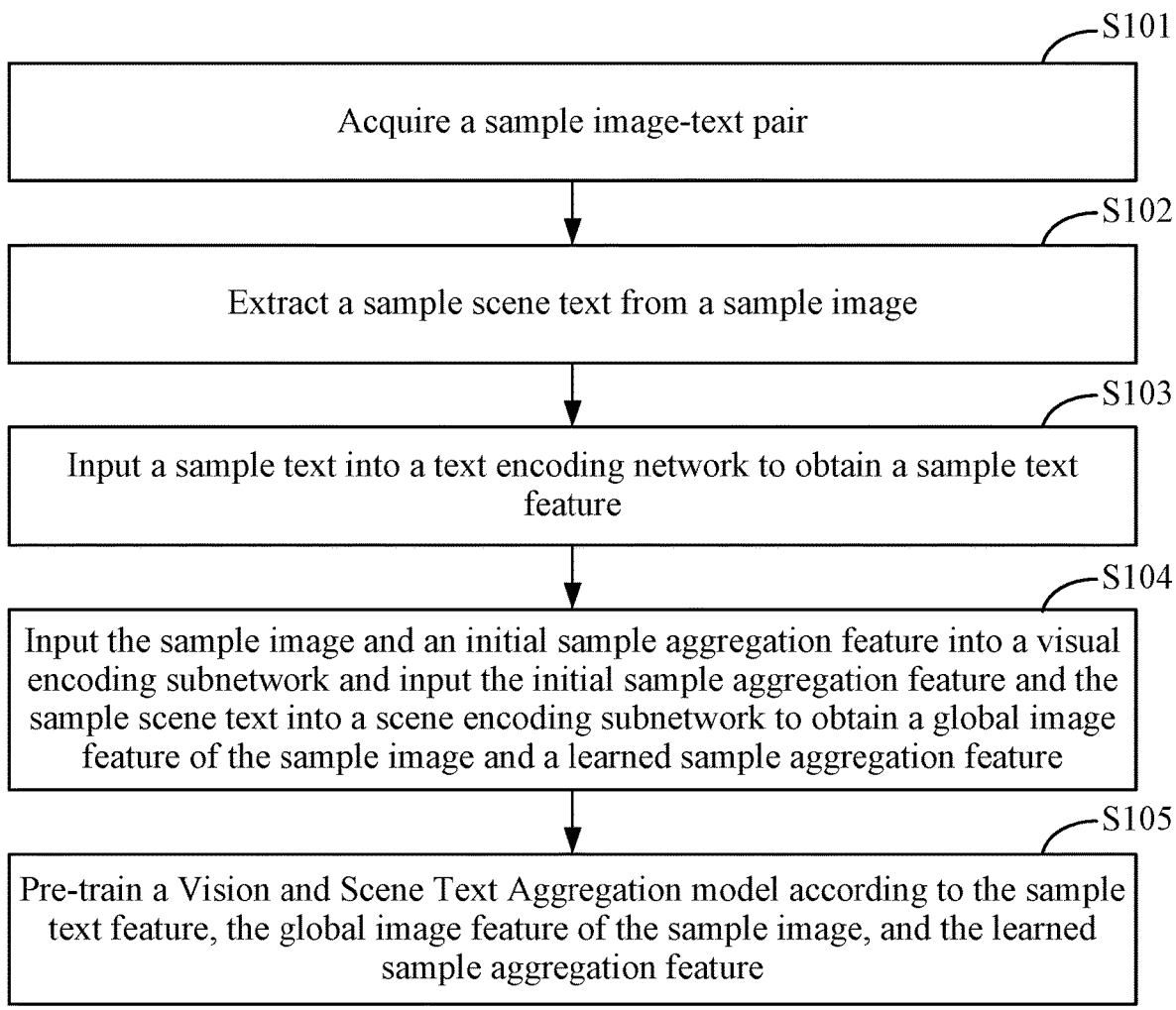
FIG. 1 is a flowchart of a pre-training method for a Vision and Scene Text Aggregation model according to an embodiment of the present disclosure.

Example embodiments of the present disclosure, including details of embodiments of the present disclosure, are described hereinafter in conjunction with drawings to facilitate understanding. The example embodiments are illustrative only. Therefore, it is to be appreciated by those of ordinary skill in the art that various changes and modifications may be made to the embodiments described herein without departing from the scope and spirit of the present disclosure. Similarly, description of well-known functions and constructions is omitted hereinafter for clarity and conciseness.

It is to be noted that terms such as "first", "second", "third", and "target" in the description, claims, and above drawings of the present disclosure are used to distinguish between similar objects and are not necessarily used to describe a particular order or sequence. Secondly, terms such as "sample" and "candidate" in the description, claims and above drawings of the present disclosure are used to distinguish between objects in different stages and are not necessarily used to describe a particular order or sequence. It is to be understood that data used in this manner are interchangeable when appropriate so that embodiments of the present disclosure described herein may also be implemented in a sequence not illustrated or described herein. Additionally, terms "including", "having", or any other variations thereof are intended to encompass a non-exclusive inclusion. For example, a process, method, system, product, or device that includes a series of steps or units may include not only the expressly listed steps or units but also steps or units that are not expressly listed or are inherent to such process, method, system, product, or device.

In a cross-modal image and text retrieval process, a scene text in an image has a positive value for understanding visual semantic information of the image. Scene text information is not fully utilized during cross-modal image and text retrieval in the related art. However, only some images include scene texts and some other images include no scene text. If scene text information is added directly to a cross-modal image retrieval process, image and text retrieval performance will decrease in the absence of a scene text.

Based on the preceding problem, the present disclosure provides a Vision and Scene Text Aggregation (ViSTA) model that has a significant effect and is used for processing cross-modal retrieval tasks in the presence and absence of the scene text. The ViSTA model is completely designed by using transformers to share an aggregation feature through visual encoding and scene encoding so that the scene text is introduced into a visual encoding process. To solve the problem of a lack of the scene text, the double-contrast supervision is further provided which includes an aggregation text contrast loss and an image text contrast loss. Compared with cross-modal retrieval in the related art, ViSTA can aggregate scene text semantics with visual features and solve the problem of a decrease in retrieval performance in the absence of the scene text.

The contributions of the present disclosure include at least the following aspects: (1) a network architecture using transformers completely is provided which can effectively aggregate a visual image with a scene text and is applicable to the case where the scene text exists and the case where no scene text exists; (2) an aggregation feature is shared through a visual encoding subnetwork and a scene encoding subnetwork, visual relevant information and the relevant information of the scene text are exchanged, and a visual feature is enhanced through double contrast losses; (3) it is found through researches that the ViSTA model has much better performance than a cross-modal image and text retrieval method in the related art.

FIG. 1 is a flowchart of a pre-training method for a Vision and Scene Text Aggregation model according to an embodiment of the present disclosure. The embodiment is applicable to the case where the Vision and Scene Text Aggregation model is pre-trained. The method may be performed by a pre-training apparatus for the Vision and Scene Text Aggregation model. The apparatus may be implemented by software and/or hardware and may be integrated into an electronic device carrying a Vision and Scene Text Aggregation model pre-training function. Optionally, the Vision and Scene Text Aggregation model includes a text encoding network and a visual scene encoding network, and the visual scene encoding network includes a visual encoding subnetwork and a scene encoding subnetwork. As shown in FIG. 1, the pre-training method for the Vision and Scene Text Aggregation model in the embodiment may include S101 to S105.

In S101, a sample image-text pair is acquired.

In the embodiment, the sample image-text pair is sample data for pre-training the Vision and Scene Text Aggregation model. Optionally, each sample image-text pair includes one sample image and one sample text for describing image content in the sample image. Using an image in which a hamburger is eaten as an example, the sample text may be that a young person is eating a hamburger.

Optionally, a large number of sample image-text pairs may be grabbed from the Internet or the like to pre-train the Vision and Scene Text Aggregation model. Considering that an image in an actual scenario may include a scene text or include no scene text, in order that the Vision and Scene Text Aggregation model is applicable to both an image and text retrieval scenario where the scene text exists and an image and text retrieval scenario where no scene text exists, the sample image in the embodiment may include a scene text or include no scene text.

In S102, a sample scene text is extracted from the sample image.

In the embodiment, the sample scene text refers to a text in the sample image.

Specifically, the sample image may be processed based on optical character recognition (OCR) technology such that the sample scene text in the sample image is obtained. Further, image position encoding information of the sample scene text in the sample image may also be obtained. It is to be noted that the sample image may include one or more sample scene texts and each sample scene text may include one or more words.

It is to be noted that for a sample image including no scene text, a sample scene text extracted from the sample image is an empty text.

In S103, the sample text is inputted into the text encoding network so that a sample text feature is obtained.

In the embodiment, the sample text feature refers to a semantic feature of the sample text and may be represented in the form of a matrix or a vector.

Specifically, the sample text may be inputted into the text encoding network and processed through the text encoding network so that the sample text feature, a text token, is obtained.

In S104, the sample image and an initial sample aggregation feature are inputted into the visual encoding subnetwork and the initial sample aggregation feature and the sample scene text are inputted into the scene encoding subnetwork so that a global image feature of the sample image and a learned sample aggregation feature are obtained.

In the embodiment, a sample aggregation feature is used for characterizing a correlation feature between an image and a scene text, that is, an aggregation token and may be in the form of a matrix or a vector. It is to be noted that the initial sample aggregation feature may be preset and the sample aggregation feature may be dynamically learned and updated in a model pre-training process or a model fine adjustment process. Multi-modal feature extraction is performed on the sample image from a global perspective such that the global image feature of the sample image is obtained, which may be referred to as an image token.

Specifically, the sample image and the initial sample aggregation feature may be inputted into the visual encoding subnetwork in the visual scene encoding network and the initial sample aggregation feature and the sample scene text may be inputted into the scene encoding subnetwork in the visual scene encoding network so that the sample image, the initial sample aggregation feature, and the sample scene text are processed through the visual encoding subnetwork in collaboration with the scene encoding subnetwork and the global image feature of the sample image and the learned sample aggregation feature are obtained which are outputted from the visual scene encoding network.

In S105, the Vision and Scene Text Aggregation model is pre-trained according to the sample text feature, the global image feature of the sample image, and the learned sample aggregation feature.

In an optional manner, a training loss may be calculated based on a preset loss function according to the sample text feature, the global image feature of the sample image, and the learned sample aggregation feature; and the Vision and Scene Text Aggregation model may be pre-trained according to the training loss until the training loss is stabilized within a set range or the number of training times reaches a set number. The set range and the set number may be set by those skilled in the art according to actual requirements.

According to the technical solutions in the embodiment of the present disclosure, the sample text in the sample image-text pair is inputted into the text encoding network so that the sample text feature is obtained; the sample image in the sample image-text pair and the initial sample aggregation feature are inputted into the visual encoding subnetwork and the initial sample aggregation feature and the sample scene text extracted from the sample image are inputted into the scene encoding subnetwork so that the global image feature of the sample image and the learned sample aggregation feature are obtained; and the Vision and Scene Text Aggregation model is pre-trained according to the sample text feature, the global image feature of the sample image, and the learned sample aggregation feature. In the preceding technical solutions, the sample aggregation feature, the global image feature of the sample image, and the sample text feature are introduced for pre-training the Vision and Scene Text Aggregation model so that no matter whether an input image includes a scene text, the global image feature of the image can be accurately outputted and the Vision and Scene Text Aggregation model can support a retrieval task within a large range of image and text sets. That is to say, the Vision and Scene Text Aggregation model is applicable to not only cross-modal retrieval in the presence of the scene text but also cross-modal retrieval in the absence of the scene text. Additionally, in the solutions, images and texts are processed in parallel through a dual encoding structure, that is, the text encoding network and the visual scene encoding network which are parallel to each other so that cross-modal retrieval efficiency can be improved.

Based on the preceding embodiment, as an optional manner of the present disclosure, the step in which the sample text is inputted into the text encoding network so that the sample text feature is obtained may include: performing word embedding on the sample text to obtain a sample text word vector; determining a word encoding result of the sample text according to modal information of the sample text, position encoding information of the sample text, and the sample text word vector; constructing an encoding sequence of the sample text according to an initial sample text feature and the word encoding result of the sample text; and inputting the encoding sequence of the sample text into the text encoding network to obtain a learned sample text feature.

The modal information of the sample text is preset encoding information for characterizing the sample text, a modal, to be distinguished from subsequent modal information of a sample image block and subsequent modal information of the sample scene text. For example, the modal information of the sample image block, the modal information of the sample scene text, and the modal information of the sample text may be represented by m0, m1, and m2 in sequence, that is, modals have different encoding information. The position encoding information of the sample text is word order encoding information of words belonging to the sample text in the sample text.

Specifically, the sample text may be processed based on word embedding technology such that a vector of each word in the sample text, the sample text word vector, is obtained.

Moreover, for each word in the sample text, the modal information of the sample text, position encoding information of the word, and the sample text word vector of the word may be spliced based on a certain rule such that a word encoding result of the word is obtained.

After word encoding results of the words in the sample text are determined, the encoding sequence of the sample text may be constructed according to the initial sample text feature and the word encoding results of the words. The initial sample text feature may be specifically composed of initial text encoding, the modal information of the sample text, and the position encoding information of the sample text. Optionally, the initial sample text feature is located at a first position of the encoding sequence of the sample text.

After the encoding sequence of the sample text is determined, the encoding sequence of the sample text may be inputted into the text encoding network so that the learned sample text feature is obtained.

It will be appreciated that the sample text feature is learned in conjunction with the modal information of the sample text, the position encoding information of the sample text, and the sample text word vector so that the finally determined sample text feature is more accurate.

Based on the preceding embodiment, as an optional manner of the present disclosure, the step of inputting the sample image into the visual encoding subnetwork may include: dividing the sample image into blocks to obtain a sample image block sequence; performing linear projection on a sample image block in the sample image block sequence to obtain an encoding result of the sample image block; processing the encoding result of the sample image block according to the modal information of the sample image block and position encoding information of the sample image block to obtain the processed encoding result of the sample image block; constructing an encoding sequence of the sample image according to an initial global image feature and the processed encoding result of the sample image block; and inputting the encoding sequence of the sample image into an input layer in the visual encoding subnetwork.

In the embodiment, the modal information of the sample image block is preset encoding information for characterizing the sample image, a modal. The position encoding information of the sample image block is identification information of the sample image block.

Specifically, the sample image may be divided according to a certain dimension into multiple (for example, N which is a positive integer) sample image blocks of the same size such that the sample image block sequence is obtained, which is denoted as P=[$p_1$, . . . , $p_{N_p}$].

After the sample image block sequence is obtained, for each sample image block in the sample image block sequence, the linear projection is performed on the sample image block such that the encoding result of the sample image block is obtained. Moreover, the encoding result of the sample image block, the modal information of the sample image block, and the position encoding information of the sample image block may be spliced based on a certain rule such that the processed encoding result of the sample image block is obtained.

After processed encoding results of the sample image blocks are determined, the encoding sequence of the sample image may be constructed according to the initial global image feature and the processed encoding results of the sample image blocks. The initial global image feature may be specifically composed of image encoding to be learned, modal information of the sample image blocks, and position encoding information of the sample image blocks. Optionally, the initial global image feature is located at a first position of the encoding sequence of the sample image. After the encoding sequence of the sample image is determined, the encoding sequence of the sample image may be inputted into the input layer in the visual encoding subnetwork.

It will be appreciated that in the present disclosure, the encoding result of the sample image block is determined in image division and linear projection manners, which reduces calculation complexity and improves efficiency compared with the acquisition of an encoding result of an image block in an image by a detector. Meanwhile, the encoding sequence of the sample image is determined in conjunction with the modal information of the sample image block, the position encoding information of the sample image block, and the initial global image feature so that the visual encoding subnetwork can extract richer features of the sample image.

Based on the preceding embodiment, as an optional manner of the present disclosure, the step of inputting the sample scene text into the scene encoding subnetwork may include: performing the word embedding on the sample scene text to obtain a sample scene text vector; determining an encoding result of the sample scene text according to image position encoding information of the sample scene text, modal information of the sample scene text, character position encoding information of the sample scene text, and the sample scene text vector; constructing an encoding sequence of the sample scene text according to an initial sample scene text feature and the encoding result of the sample scene text; and inputting the encoding sequence of the sample scene text into an input layer in the scene encoding subnetwork.

In the embodiment, the modal information of the sample scene text is preset encoding information for characterizing the scene text, a modal, in the sample image. The character position encoding information of the sample scene text is used for uniquely identifying an order of characters in the sample scene text. The image position encoding information of the sample scene text is image position information of the sample scene text in the sample image.

Specifically, for each sample scene text extracted from the sample image, the sample scene text may be processed based on the word embedding technology such that the sample scene text vector of the sample scene text is obtained, which is denoted as Embedding($o^{word}$).

After the sample scene text vector of the sample scene text is determined, the image position encoding information (denoted as $F_{linear}(o^{bbox})$) of the sample scene text, the modal information (denoted as $S^{type}$) of the sample scene text, the character position encoding information (denoted as $S^{token\_id}$) of the sample scene text, and the sample scene text vector (denoted as Embedding($o^{word}$)) may be spliced based on a certain rule such that the encoding result (denoted as $S_0$) of the sample scene text is obtained. For example, the image position encoding information, the modal information of the sample scene text, the character position encoding information of the sample scene text, and the sample scene text vector may be spliced in sequence such that the encoding result of the sample scene text is obtained. For example, the encoding result of the sample scene text may be obtained by the following formulas:

$$S^{init}=\text{Embedding}(o^{word})+F_{linear}(o^{bbox})$$

$$S_0=S^{init}+S^{type}+S^{token\_id}$$

$S_0$ denotes the encoding result of the sample scene text, $F_{linear}(o^{bbox})$ denotes the image position encoding information, Embedding($o^{word}$) denotes the sample scene text vector, $S^{type}$ denotes the modal information of the sample scene text, and $S^{token\_id}$ denotes the character position encoding information of the sample scene text.

After encoding results of sample scene texts in the sample image are determined, an encoding sequence of the sample scene texts may be constructed according to the initial sample scene text feature and the encoding results of the sample scene texts. The initial sample scene text feature may be specifically composed of scene text encoding to be learned, the modal information of the sample scene text, and the image position encoding information and the character position encoding information of the sample scene text. Optionally, the initial sample scene text feature is located at a first position of the encoding sequence of the sample scene text. After the encoding sequence of the sample scene text is determined, the encoding sequence of the sample scene text may be inputted into the input layer in the scene encoding subnetwork.

It will be appreciated that the encoding sequence of the sample scene text is determined in conjunction with the image position encoding information, the modal information of the sample scene text, the character position encoding information of the sample scene text, and the initial sample scene text feature so that the visual encoding subnetwork can extract richer features of the sample scene text.

Figure 2A:
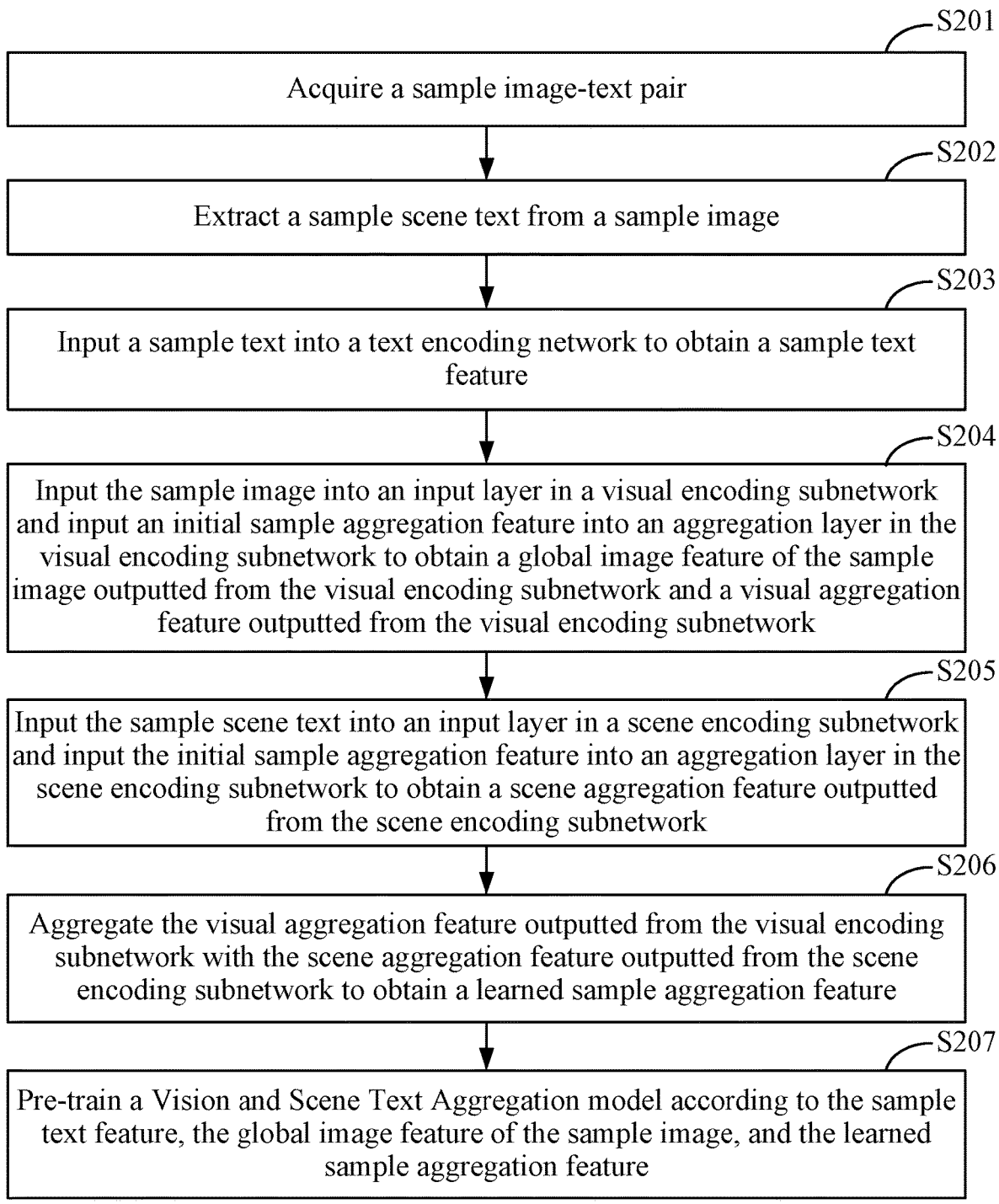
FIG. 2A is a flowchart of another pre-training method for a Vision and Scene Text Aggregation model according to an embodiment of the present disclosure.
Figure 2B:
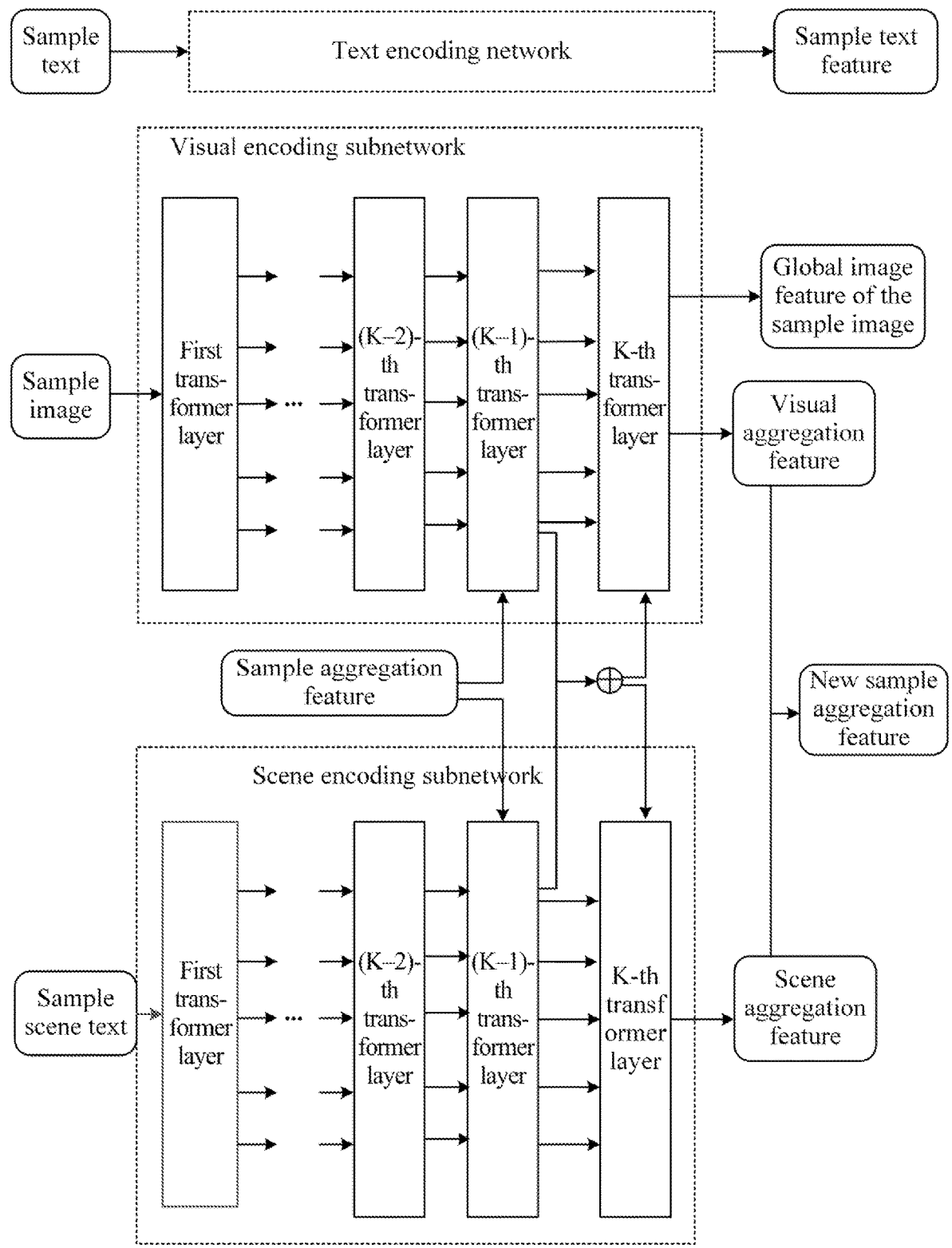
FIG. 2B is a schematic diagram of a Vision and Scene Text Aggregation model according to an embodiment of the present disclosure.

FIG. 2A is a flowchart of another pre-training method for a Vision and Scene Text Aggregation model according to an embodiment of the present disclosure. FIG. 2B is a schematic diagram of a Vision and Scene Text Aggregation model according to an embodiment of the present disclosure. Based on the preceding embodiment, the step in which the sample image and the initial sample aggregation feature are inputted into the visual encoding subnetwork and the initial sample aggregation feature and the sample scene text are inputted into the scene encoding subnetwork so that the global image feature of the sample image and the learned sample aggregation feature are obtained is further optimized in the embodiment, so as to provide an optional solution. As shown in FIG. 2A, the training method for the Vision and Scene Text Aggregation model in the embodiment may include S201 to S207.

In S201, a sample image-text pair is acquired.

The sample image-text pair includes a sample image and a sample text.

In S202, a sample scene text is extracted from the sample image.

In S203, the sample text is inputted into a text encoding network so that a sample text feature is obtained.

In S204, the sample image is inputted into an input layer in a visual encoding subnetwork and an initial sample aggregation feature is inputted into an aggregation layer in the visual encoding subnetwork so that a global image feature of the sample image outputted from the visual encoding subnetwork and a visual aggregation feature outputted from the visual encoding subnetwork are obtained.

In S205, the sample scene text is inputted into an input layer in a scene encoding subnetwork and the initial sample aggregation feature is inputted into an aggregation layer in the scene encoding subnetwork so that a scene aggregation feature outputted from the scene encoding subnetwork is obtained.

In S206, the visual aggregation feature outputted from the visual encoding subnetwork is aggregated with the scene aggregation feature outputted from the scene encoding subnetwork so that a learned sample aggregation feature is obtained.

In S207, the Vision and Scene Text Aggregation model is pre-trained according to the sample text feature, the global image feature of the sample image, and the learned sample aggregation feature.

In the embodiment, the visual encoding subnetwork may be composed of several transformer layers and the scene encoding subnetwork may also be composed of several transformer layers. Preferably, the visual encoding subnetwork may have the same network structure, that is, the same number of network layers, as the scene encoding subnetwork.

Further, the visual encoding subnetwork may include at least one aggregation layer and the scene encoding subnetwork may also include at least one aggregation layer. Optionally, the visual encoding subnetwork has the same number of aggregation layers as the scene encoding subnetwork; and in the case where the visual encoding subnetwork has the same number of network layers as the scene encoding subnetwork, the aggregation layer in the visual encoding subnetwork is at the same position as the aggregation layer in the scene encoding subnetwork.

For example, in the visual encoding subnetwork, a learning process in any one transformer layer before the aggregation layer in the visual encoding subnetwork may be represented by the following formulas:

$$Y_l \leftarrow MHSA(LN(V_l))+V_l$$

$$V_{l+1} \leftarrow MLP(LN(Y_l))+Y_l.$$

$V_l$ denotes an image feature (that is, an image token) predicted by an l-th layer, MHSA(•) denotes a multi-head self-attention layer, MLP(•) denotes a multilayer perceptron layer, LN(•) denotes layer normalization, and $Y_l$ denotes an intermediate variable; where l is a positive integer.

In the scene encoding subnetwork, a learning process in any one transformer layer before the aggregation layer in the scene encoding subnetwork may be represented by the following formulas:

$$X_l \leftarrow MHSA(LN(S_l))+S_l$$

$$S_{l+1} \leftarrow MLP(LN(X_l))+X_l.$$

$S_l$ denotes a scene text feature (that is, a scene text token) predicted by an l-th layer, and $X_l$ denotes an intermediate variable.

In the visual encoding subnetwork, a first aggregation layer outputs a new global image feature and a visual aggregation feature according to the initial sample aggregation feature and a global image feature received from an upper layer. In the scene encoding subnetwork, a first aggregation layer outputs a new scene text feature and a scene aggregation feature according to the initial sample aggregation feature and a scene text feature received from an upper layer. The visual aggregation feature outputted from the first aggregation layer in the visual encoding subnetwork is aggregated with the scene aggregation feature outputted from the first aggregation layer in the scene encoding subnetwork so that a more learned sample aggregation feature is obtained.

Then, in the visual encoding subnetwork, a second aggregation layer outputs a new global image feature and a new visual aggregation feature according to the global image feature outputted from the first aggregation layer and the more learned sample aggregation feature. In the scene encoding subnetwork, a second aggregation layer outputs a new scene text feature and a new scene aggregation feature according to the scene text feature outputted from the first aggregation layer and the more learned sample aggregation feature. The visual aggregation feature outputted from the second aggregation layer in the visual encoding subnetwork is aggregated with the scene aggregation feature outputted from the second aggregation layer in the scene encoding subnetwork so that a more learned sample aggregation feature is obtained.

In the same manner, in the visual encoding subnetwork, a global image feature and a visual aggregation feature outputted from a last aggregation layer (that is, an output layer) may be obtained; in the scene encoding subnetwork, a scene aggregation feature outputted from a last aggregation layer (that is, an output layer) may be obtained; and the visual aggregation feature outputted from the last aggregation layer in the visual encoding subnetwork is aggregated with the scene aggregation feature outputted from the last aggregation layer in the scene encoding subnetwork so that the learned sample aggregation feature is obtained, which is used as a final learning result of the sample aggregation feature.

For example, a processing flow in any one aggregation layer in the visual encoding subnetwork may be as follows:

$$M_l \leftarrow MHSA(LN([V_l;F_l])) + [V_l;F_l]$$

$$[V_{l+1};V_{FUS}] \leftarrow MLP(LN(M_l)) + M_l.$$

$V_{FUS}$ denotes a visual aggregation feature outputted from the visual encoding subnetwork, $M_l$ denotes an intermediate variable, and $F_l$ denotes a sample aggregation feature, that is, a sample aggregation token.

Similarly, a processing flow in any one aggregation layer in the scene encoding subnetwork may be as follows:

$$N_l \leftarrow MHSA(LN([S_l;F_l])) + [S_l;F_l]$$

$$[S_{l+1};S_{FUS}] \leftarrow MLP(LN(N_l)) + N_l.$$

$S_l$ denotes the scene text feature in the l-th layer, $S_{FUS}$ denotes a scene aggregation feature outputted from the scene encoding subnetwork, and $N_l$ denotes an intermediate variable.

As shown in FIG. 2B, it is assumed that the visual encoding subnetwork is composed of K transformer layers and the scene encoding subnetwork is composed of K transformer layers; a (K−1)-th transformer layer and a K-th transformer layer in the visual encoding subnetwork are used as aggregation layers; and a (K−1)-th transformer layer and a K-th transformer layer in the scene encoding subnetwork are used as aggregation layers. K is a positive integer greater than 2.

The global image feature of the sample image and the learned sample aggregation feature may be determined by the following process: in the visual encoding subnetwork, the sample image is inputted into the input layer in the visual encoding subnetwork and learned in first (K−2) transformer layers so that a global image feature predicted by a (K−2)-th transformer layer is obtained. Similarly, in the scene encoding subnetwork, the sample scene text is inputted into the input layer in the scene encoding subnetwork and learned in first (K−2) transformer layers so that a scene text feature predicted by a (K−2)-th transformer layer is obtained.

Figure 2C:
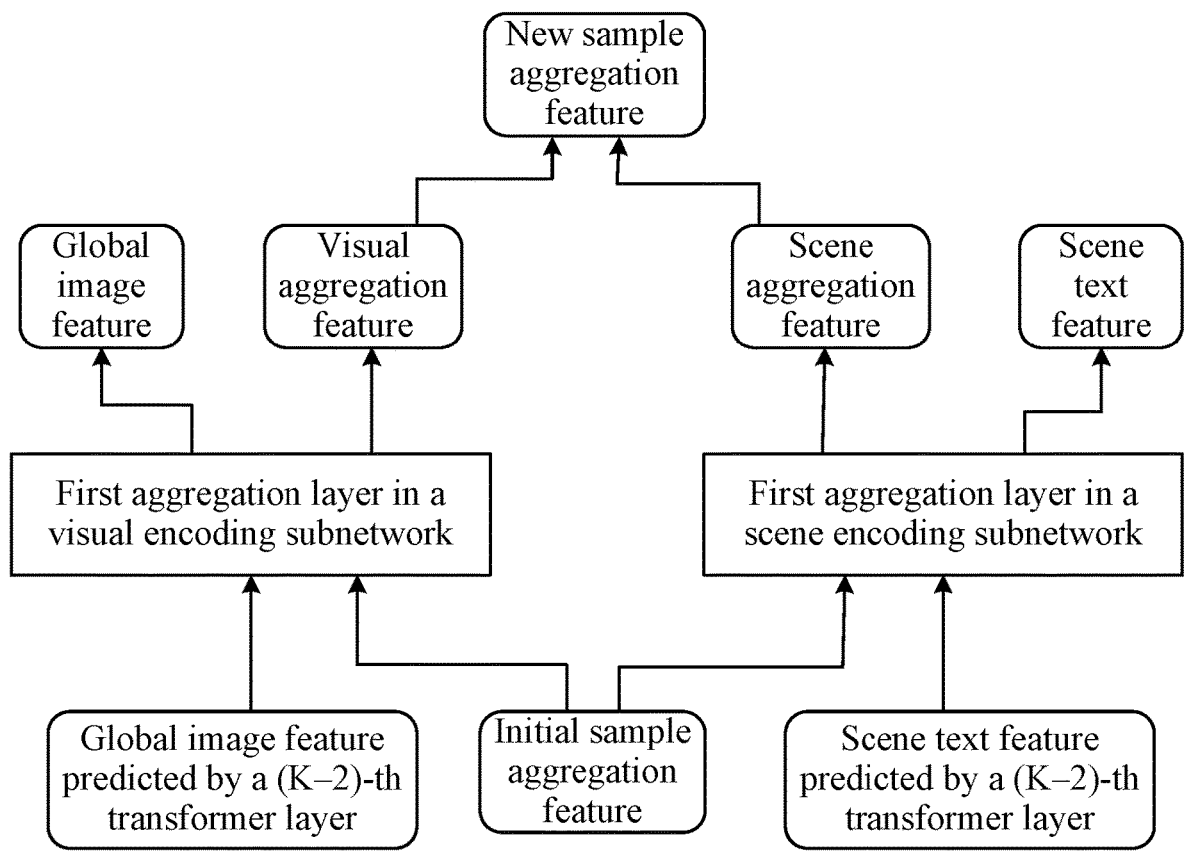
FIG. 2C is a schematic diagram of a process of determining a sample aggregation feature according to an embodiment of the present disclosure.

As shown in FIG. 2C, in the visual encoding subnetwork, the initial sample aggregation feature and the global image feature predicted by the (K−2)-th transformer layer are inputted into the first aggregation layer in the visual encoding subnetwork so that the global image feature and the visual aggregation feature outputted from the first aggregation layer in the visual encoding subnetwork are obtained; in the scene encoding subnetwork, the initial sample aggregation feature and the scene text feature predicted by the (K−2)-th transformer layer are inputted into the first aggregation layer in the scene encoding subnetwork so that the scene text feature and the scene aggregation feature outputted from the first aggregation layer in the scene encoding subnetwork are obtained; and the visual aggregation feature and the scene aggregation feature determined by the first aggregation layers are aggregated so that the more learned sample aggregation feature is obtained.

Then, in the visual encoding subnetwork, the global image feature outputted from the first aggregation layer in the visual encoding subnetwork and the more learned sample aggregation feature are inputted into the second aggregation layer in the visual encoding subnetwork so that a learned global image feature and the new visual aggregation feature are obtained; in the scene encoding subnetwork, the scene text feature outputted from the first aggregation layer in the scene encoding subnetwork and the more learned sample aggregation feature are inputted into the second aggregation layer in the scene encoding subnetwork so that the scene aggregation feature is obtained; and the visual aggregation feature and the scene aggregation feature determined by the second aggregation layers are aggregated so that the more learned sample aggregation feature is obtained, which is used as the final sample aggregation feature.

According to the technical solutions in the embodiment of the present disclosure, the sample scene text is extracted from the sample image in the sample image-text pair, the sample text in the sample image-text pair is inputted into the text encoding network so that the sample text feature is obtained, and the sample image is inputted into the input layer in the visual encoding subnetwork and the initial sample aggregation feature is inputted into the aggregation layer in the visual encoding subnetwork so that the global image feature of the sample image and the visual aggregation feature outputted from the visual encoding subnetwork are obtained; the sample scene text is inputted into the input layer in the scene encoding subnetwork and the initial sample aggregation feature is inputted into the aggregation layer in the scene encoding subnetwork so that the scene aggregation feature outputted from the scene encoding subnetwork is obtained; and the visual aggregation feature and the scene aggregation feature are aggregated so that the learned sample aggregation feature is obtained, and the Vision and Scene Text Aggregation model is pre-trained according to the sample text feature, the global image feature of the sample image, and the learned sample aggregation feature. In the preceding technical solutions, the aggregation layer is introduced into the visual encoding subnetwork and the scene encoding subnetwork separately so that a visual scene encoding network can fully learn the scene text feature and predict the global image feature by using the scene text feature, improving the accuracy of the global image feature.

Figure 3:
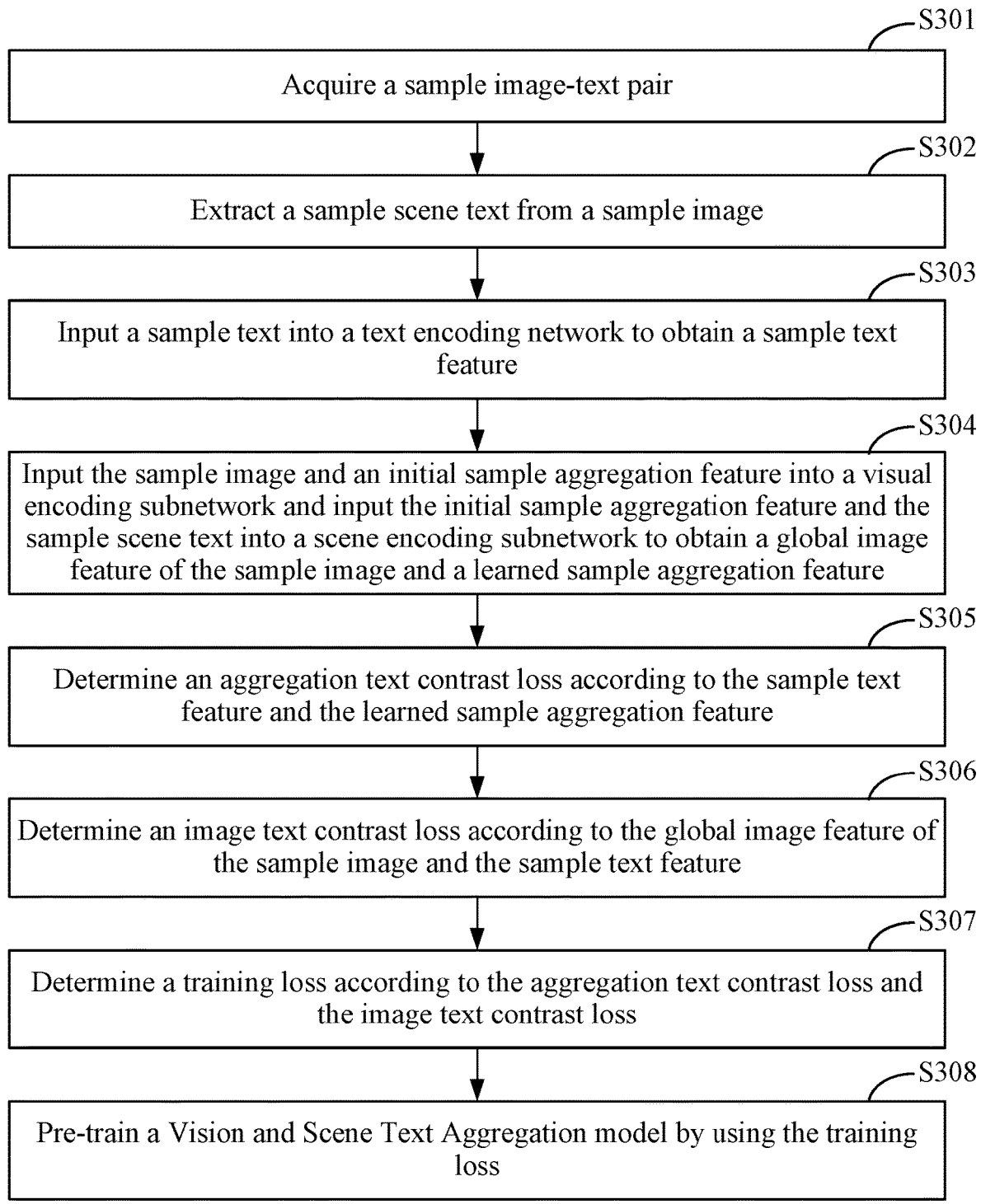
FIG. 3 is a flowchart of another pre-training method for a Vision and Scene Text Aggregation model according to an embodiment of the present disclosure.

FIG. 3 is a flowchart of another pre-training method for a Vision and Scene Text Aggregation model according to an embodiment of the present disclosure. Based on the preceding embodiments, the step in which the Vision and Scene Text Aggregation model is pre-trained according to the sample text feature, the global image feature of the sample image, and the learned sample aggregation feature is further optimized in the embodiment, so as to provide an optional solution. As shown in FIG. 3, the training method for the Vision and Scene Text Aggregation model in the embodiment may include S301 to S308.

In S301, a sample image-text pair is acquired.

The sample image-text pair includes a sample image and a sample text.

In S302, a sample scene text is extracted from the sample image.

In S303, the sample text is inputted into a text encoding network so that a sample text feature is obtained.

In S304, the sample image and an initial sample aggregation feature are inputted into a visual encoding subnetwork and the initial sample aggregation feature and the sample scene text are inputted into a scene encoding subnetwork so that a global image feature of the sample image and a learned sample aggregation feature are obtained.

In S305, an aggregation text contrast loss is determined according to the sample text feature and the learned sample aggregation feature.

Specifically, N sample image-text pairs may form $N^2$ image-text feature pairs or $N^2$ aggregation-text feature pairs and then a contrast loss is to maximize similarities between N correct pairs of data and minimize similarities between $(N^2-N)$ pairs of data. The aggregation text contrast loss is defined as $$L_{ftc} = \frac{1}{2}(L_{f2t} + L_{t2f}).$$

$$\mathcal{L}_{f2t} = -\frac{1}{N}\sum_{i=1}^{N}\log\frac{\exp(f_i^\top t_i/\sigma)}{\sum_{j=1}^{N}\exp(f_i^\top t_j/\sigma)}$$

$$\mathcal{L}_{t2f} = -\frac{1}{N}\sum_{i=1}^{N}\log\frac{\exp(t_i^\top f_i/\sigma)}{\sum_{j=1}^{N}\exp(t_i^\top f_j/\sigma)}$$

$L_{ftc}$ denotes the aggregation text contrast loss, $f_i$ denotes a learned sample aggregation feature of an i-th sample image-text pair, $t_i$ denotes a sample text feature of the i-th sample image-text pair, and $\sigma$ denotes a training variable and may be set to 0.07 initially. It is to be noted that N and i are positive integers and i is less than or equal to N.

In S306, an image text contrast loss is determined according to the global image feature of the sample image and the sample text feature.

Specifically, N sample image-text pairs may form $N^2$ image-text feature pairs or $N^2$ global-text feature pairs and then a contrast loss is to maximize similarities between N correct pairs of data and minimize similarities between $(N^2-N)$ pairs of data. The image text contrast loss is defined as $$L_{itc} = \frac{1}{2}(L_{i2t} + L_{t2i}).$$

$$\mathcal{L}_{i2t} = -\frac{1}{N}\sum_{i=1}^{N}\log\frac{\exp(v_i^\top t_i/\sigma)}{\sum_{j=1}^{N}\exp(v_i^\top t_j/\sigma)}$$

$$\mathcal{L}_{t2i} = -\frac{1}{N}\sum_{i=1}^{N}\log\frac{\exp(t_i^\top v_i/\sigma)}{\sum_{j=1}^{N}\exp(t_i^\top v_j/\sigma)}$$

$L_{itc}$ denotes the image text contrast loss, $v_i$ denotes a global image feature of a sample image corresponding to the i-th sample image-text pair, $t_i$ denotes the sample text feature corresponding to the i-th sample image-text pair, and $\sigma$ denotes the training variable and may be set to 0.07 initially. It is to be noted that N and i are positive integers and i is less than or equal to N.

In S307, a training loss is determined according to the aggregation text contrast loss and the image text contrast loss.

Specifically, the training loss may be a weighted sum of the aggregation text contrast loss and the image text contrast loss. For example, the training loss may be determined by the following formula:

$$L_{total}=\alpha L_{itc}+(1-\alpha)L_{ftc}$$

$L_{total}$ denotes the training loss, $L_{ftc}$ denotes the aggregation text contrast loss, $L_{itc}$ denotes the image text contrast loss, and $\alpha$ denotes a parameter for adjusting a weight between the aggregation text contrast loss and the image text contrast loss and may preferably be 0.9.

In S308, the Vision and Scene Text Aggregation model is pre-trained by using the training loss.

According to the technical solutions in the embodiment of the present disclosure, the sample scene text is extracted from the sample image in the sample image-text pair, and the sample text in the sample image-text pair is inputted into the text encoding network so that the sample text feature is obtained; the sample image in the sample image-text pair and the initial sample aggregation feature are inputted into the visual encoding subnetwork and the initial sample aggregation feature and the sample scene text are inputted into the scene encoding subnetwork so that the global image feature of the sample image and the learned sample aggregation feature are obtained; then, the aggregation text contrast loss is determined according to the sample text feature and the learned sample aggregation feature, the image text contrast loss is determined according to the global image feature of the sample image and the sample text feature, the training loss is determined according to the aggregation text contrast loss and the image text contrast loss, and the Vision and Scene Text Aggregation model is pre-trained by using the training loss. In the preceding technical solutions, the loss between the sample text feature and the learned sample aggregation feature and the loss between the global image feature of the sample image and the sample text feature, that is, double contrast losses are calculated so that the image and text retrieval accuracy of the Vision and Scene Text Aggregation model is improved in the presence of a scene text. Further, since the double contrast losses include the loss between the global image feature of the sample image and the sample text feature, that is, a loss between an image and a text, the image and text retrieval accuracy of the Vision and Scene Text Aggregation model can be ensured even in the absence of the scene text.

Based on the preceding embodiment, as an optional manner of the present disclosure, the step in which the training loss is determined according to the aggregation text contrast loss and the image text contrast loss may include the steps described below. It is determined whether the sample scene text is an empty text or a non-empty text.

In the case where the sample scene text is the empty text, the image text contrast loss is used as the training loss; in the case where the sample scene text is the non-empty text, a sum of the aggregation text contrast loss and the image text contrast loss is used as the training loss.

Specifically, whether the sample scene text is the empty text or the non-empty text may be determined based on OCR technology so as to obtain a determination result. If the determination result is that the sample scene text is the empty text, it is determined that the aggregation text contrast loss is invalid and the image text contrast loss is used as the training loss. If the determination result is that the sample scene text is the non-empty text, it is determined that the aggregation text contrast loss is valid and the training loss is determined according to the aggregation text contrast loss and the image text contrast loss. In the case where the sample scene text is the empty text, only the image text contrast loss is used for model pre-training so that a model training result can maintain good performance even for an image with no scene text.

Based on the preceding embodiment, experiments are carried out by using a scene text perception retrieval task and a conventional image and text retrieval task, separately. The scene text perception retrieval task is image and text retrieval in the scenario where an image includes a scene text. The conventional image and text retrieval task is image and text retrieval in the scenario where an image includes no scene text.

For example, during the scene text perception retrieval task, experiments are carried out by using CTC-1K and CTC-5K datasets. The experimental results for verification are shown in Table 1. Compared with existing cross-modal retrieval techniques such as a Semantic Context Aware Network (SCAN), a Visual Semantic Reasoning Network (VSRN), and a Scene-Text Aware Retrieval Network (STARNet), the Vision and Scene Text Aggregation models (that is, ViSTA-S and ViSTA-B) of the present disclosure have superior performance on CTC datasets. With a CTC-1K text retrieval task as an example, the Vision and Scene Text Aggregation models of the present disclosure achieve a 7.4% improvement. With increased model volumes, the Vision and Scene Text Aggregation models of the present disclosure can achieve higher performance.

TABLE 1

Performance contrast of the technical solutions of the present disclosure with other methods on CTC datasets

| | CTC-1K | | | | | | CTC-5K | | | | | |
|---|---|---|---|---|---|---|---|---|---|---|---|---|
| | Image-to-text | | | Text-to-image | | | Image-to-text | | | Text-to-image | | |
| Model | R@1 | R@5 | R@10 | R@1 | R@5 | R@10 | R@1 | R@5 | R@10 | R@1 | R@5 | R@10 |
| SCAN | 36.3 | 63.7 | 75.2 | 26.6 | 53.6 | 65.3 | 22.8 | 45.6 | 54.3 | 12.3 | 28.6 | 39.9 |
| VSRN | 38.2 | 67.4 | 79.1 | 26.6 | 54.2 | 66.2 | 23.7 | 47.6 | 59.1 | 14.9 | 34.7 | 45.5 |
| STARNet | 44.1 | 74.8 | 82.7 | 31.5 | 60.8 | 72.4 | 26.4 | 51.1 | 63.9 | 17.1 | 37.4 | 48.3 |
| ViSTA-S | 51.5 | 76.0 | 86.3 | 35.3 | 64.2 | 76.7 | 29.2 | 53.6 | 65.1 | 19.0 | 41.1 | 52.5 |
| ViSTA-B | 62.5 | 88.1 | 93.9 | 48.5 | 77.0 | 86.3 | 47.4 | 73.3 | 81.6 | 33.5 | 59.5 | 69.5 |

For example, during the conventional image and text retrieval task, experiments are carried out by using Flickr30K and COCO-5K datasets. The experimental results for verification are shown in Table 2. With substantially the same time consumed, the Vision and Scene Text Aggregation model (that is, the ViSTA-B model) of the present disclosure has better performance than cross-modal retrieval techniques such as an Iterative Matching with Recurrent Attention Memory (IMRAM), a Graph Structured Matching Network (GSMN), Similarity Graph Reasoning and Attention Filtration (SGRAF), Visual-BERT (Vil-BERT), Unicoder-VL, UNITER-B, ERNIE-Vil-B, Pixel-BERT-X, SOHO, H Xue et al., Pixel-BERT-R, and ViLT-B. Moreover, with an increased model volume, the Vision and Scene Text Aggregation model (that is, a ViSTA-L model) of the present disclosure is comparable to a single-tower model which consumes much more time.

TABLE 2

Performance contrast of the technical solutions of the present disclosure with other methods on Flickr30K and COCO-5K datasets

| | | Flickr30K (1K) | | | | | | MS-COCO (5K) | | | | | |
|---|---|---|---|---|---|---|---|---|---|---|---|---|---|
| | Time | Image-to-text | | | Text-to-image | | | Image-to-text | | | Text-to-image | | |
| Model | (ms) | R@1 | R@5 | R@10 | R@1 | R@5 | R@10 | R@1 | R@5 | R@10 | R@1 | R@5 | R@10 |
| SCAN | — | 67.4 | 90.3 | 95.8 | 48.6 | 77.7 | 85.2 | 50.4 | 82.2 | 90.0 | 38.6 | 69.3 | 80.4 |
| VSRN | — | 71.3 | 90.6 | 96.0 | 54.7 | 81.8 | 88.2 | 53.0 | 81.1 | 89.4 | 40.5 | 70.6 | 81.1 |
| IMRAM | — | 74.1 | 93.0 | 96.6 | 53.9 | 79.4 | 87.2 | 53.7 | 83.2 | 91.0 | 39.7 | 69.1 | 79.8 |
| GSMN | — | 76.4 | 94.3 | 97.3 | 57.4 | 82.3 | 89.0 | — | — | — | — | — | — |
| SGRAF | — | 77.8 | 94.1 | 97.4 | 58.5 | 83.0 | 88.8 | 57.8 | — | 91.6 | 41.9 | — | 81.3 |
| Vil-BERT | ~920 | 58.2 | 84.9 | 91.5 | — | — | — | — | — | — | — | — | — |
| Unicoder-VL | ~925 | 86.2 | 96.3 | 99.0 | 71.5 | 91.2 | 95.2 | 62.3 | 87.1 | 92.8 | 48.4 | 76.7 | 85.9 |
| UNITER-B | ~900 | 85.9 | 97.1 | 98.8 | 72.5 | 92.4 | 96.1 | 64.4 | 87.4 | 93.1 | 50.3 | 78.5 | 87.2 |

TABLE 2-continued

Performance contrast of the technical solutions of the present
disclosure with other methods on Flickr30K and COCO-5K datasets

| | | Flickr30K (1K) | | | | | | MS-COCO (5K) | | | | | |
|---|---|---|---|---|---|---|---|---|---|---|---|---|---|
| | Time | Image-to-text | | | Text-to-image | | | Image-to-text | | | Text-to-image | | |
| Model | (ms) | R@1 | R@5 | R@10 | R@1 | R@5 | R@10 | R@1 | R@5 | R@10 | R@1 | R@5 | R@10 |
| ERNIE-ViL-B | ~920 | 86.7 | 97.8 | 99.0 | 74.4 | 92.7 | 95.9 | — | — | — | — | — | — |
| Pixel-BERT-X | ~160 | 87.0 | 98.9 | 99.5 | 71.5 | 92.1 | 95.8 | 63.6 | 87.5 | 93.6 | 50.1 | 77.6 | 86.2 |
| SOHO | — | 86.5 | 98.1 | 99.3 | 72.5 | 92.7 | 96.1 | 66.4 | 88.2 | 93.8 | 50.6 | 78.0 | 86.7 |
| H Xue et al. | — | 87.0 | 98.4 | 99.5 | 73.5 | 93.1 | 96.4 | — | — | — | — | — | — |
| Pixel-BERT-R | ~60 | 75.7 | 94.7 | 97.1 | 53.4 | 80.4 | 88.5 | 59.8 | 85.5 | 91.6 | 41.1 | 69.7 | 80.5 |
| ViLT-B | ~15 | 83.5 | 96.7 | 98.6 | 64.4 | 88.7 | 93.8 | 61.5 | 86.3 | 92.7 | 42.7 | 72.9 | 83.1 |
| ViSTA-B | ~17 | 84.8 | 97.4 | 99.0 | 68.9 | 91.1 | 95.1 | 63.9 | 87.8 | 93.6 | 47.8 | 75.8 | 84.5 |
| ViSTA-L | ~40 | 89.5 | 98.4 | 99.6 | 75.8 | 94.2 | 96.9 | 68.9 | 90.1 | 95.4 | 52.6 | 79.6 | 87.6 |

In conclusion, the experiments on scene text perception datasets and conventional image and text retrieval datasets verify the effectiveness of the Vision and Scene Text Aggregation model of the present disclosure which can achieve the best level of public indicators in image and text retrieval tasks with and without the scene text.

It is to be noted that the Vision and Scene Text Aggregation model of the present disclosure pre-trained through image and text contrast may be directly used for downstream retrieval tasks and the pre-trained Vision and Scene Text Aggregation model may also be finely adjusted by any service party, so as to satisfy an actual service requirement.

Optionally, embodiments of the present disclosure further provide a training method for a Vision and Scene Text Aggregation model. Specifically, the training method includes: acquiring a service image-text pair provided by a service party; and finely adjusting the Vision and Scene Text Aggregation model by using a service image and a service text as training data, where the Vision and Scene Text Aggregation model is obtained based on any pre-training method for the Vision and Scene Text Aggregation model in the present disclosure. The service image-text pair includes the service image and the service text, where the service text is used for describing image content in the service image.

Specifically, the service image-text pair is acquired from the service party and used as the training data; and the training data is inputted into the Vision and Scene Text Aggregation model and model parameters in the Vision and Scene Text Aggregation model are adjusted.

It will be appreciated that the pre-trained Vision and Scene Text Aggregation model is finely adjusted in the embodiment so that the Vision and Scene Text Aggregation model is more applicable to an actual service scenario.

Figure 4:
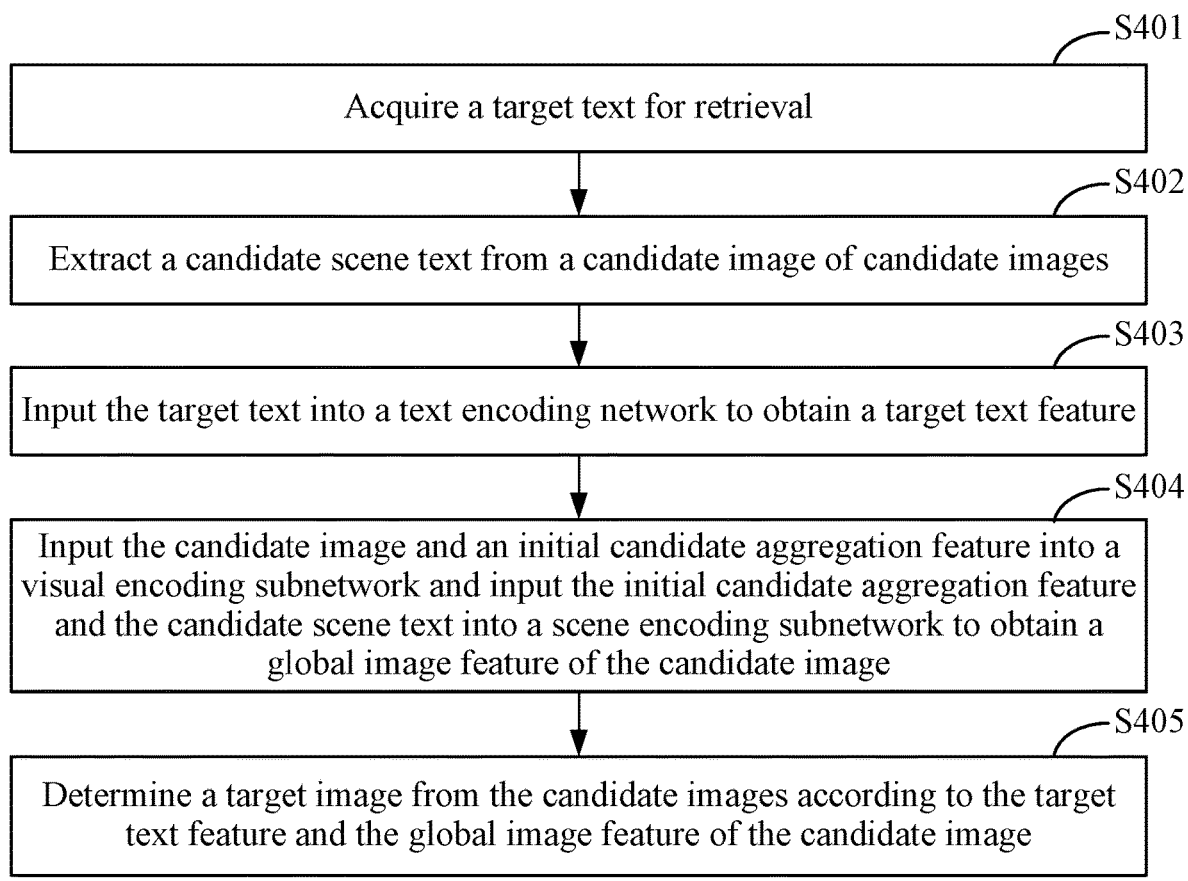
FIG. 4 is a flowchart of an image and text retrieval method for a Vision and Scene Text Aggregation model according to an embodiment of the present disclosure.

FIG. 4 is a flowchart of an image and text retrieval method for a Vision and Scene Text Aggregation model according to an embodiment of the present disclosure. The embodiment is applicable to image and text retrieval. The method may be performed by an image and text retrieval apparatus. The apparatus may be implemented by software and/or hardware and may be integrated into an electronic device carrying an image and text retrieval function. The Vision and Scene Text Aggregation model includes a text encoding network and a visual scene encoding network, and the visual scene encoding network includes a visual encoding subnetwork and a scene encoding subnetwork. As shown in FIG. 4, the image and text retrieval method for the Vision and Scene Text Aggregation model in the embodiment may include S401 to S405.

In S401, a target text for retrieval is acquired.

Specifically, the target text inputted by a search demand side may be acquired. For example, the search demand side may input the target text through a search interaction interface.

In S402, a candidate scene text is extracted from a candidate image of candidate images.

In the embodiment, the candidate images are images to be selected from and may be, for example, some or all images in an image library for retrieval. The candidate scene text refers to a text in the candidate image and may include one or more words.

Specifically, each candidate image may be processed based on OCR technology such that the candidate scene text in the candidate image is obtained. Further, image position encoding information of the candidate scene text in the candidate image may also be obtained. It is to be noted that the candidate image may include one or more candidate scene texts and each candidate scene text may include one or more words.

In S403, the target text is inputted into the text encoding network so that a target text feature is obtained.

In the embodiment, the target text feature refers to a semantic feature of the target text and may be represented in the form of a matrix or a vector. Specifically, the target text may be inputted into the text encoding network and processed through the text encoding network so that the target text feature is obtained.

In S404, the candidate image and an initial candidate aggregation feature are inputted into the visual encoding subnetwork and the initial candidate aggregation feature and the candidate scene text are inputted into the scene encoding subnetwork so that a global image feature of the candidate image is obtained.

In the embodiment, a candidate aggregation feature is used for characterizing a correlation feature between a candidate image and a text and may be in the form of a matrix or a vector. It is to be noted that the initial candidate aggregation feature is a preset correlation feature between an image and a text. The global image feature of the candidate image refers to a feature of the candidate image extracted from a global perspective and may be in the form of a matrix or a vector.

Specifically, the candidate image may be inputted into an input layer in the visual encoding subnetwork, the initial candidate aggregation feature may be inputted into an aggregation layer in the visual encoding subnetwork, the candidate scene text may be inputted into an input layer in the scene encoding subnetwork, and the initial candidate aggregation feature may be inputted into an aggregation layer in the scene encoding subnetwork so that the candidate image, the initial candidate aggregation feature, and the candidate scene text are processed through the visual encoding subnetwork in collaboration with the scene encoding subnetwork and the global image feature of the candidate image is obtained.

It is to be noted that in a model training stage, the visual scene encoding network can fully learn correlations between vision and scene texts to predict global image features. Therefore, in a model use stage, the global image feature outputted from the visual scene encoding network incorporates a relevant feature of the scene text.

In S405, a target image is determined from the candidate images according to the target text feature and the global image feature of the candidate image.

Specifically, for each candidate image, a similarity between the target text feature and the global image feature of the candidate image may be determined; and the target image is determined from the candidate images according to the similarity. For example, a candidate image with a largest similarity may be used as the target image.

It is to be noted that the Vision and Scene Text Aggregation model in the embodiment may be obtained based on any pre-training method for the Vision and Scene Text Aggregation model in the present disclosure or any training method for the Vision and Scene Text Aggregation model in the present disclosure.

According to the technical solutions in the embodiment of the present disclosure, the candidate scene text is extracted from the candidate image, the acquired target text is inputted into the text encoding network so that the target text feature is obtained, the candidate image and the initial candidate aggregation feature are inputted into the visual encoding subnetwork and the initial candidate aggregation feature and the candidate scene text are inputted into the scene encoding subnetwork so that the global image feature of the candidate image is obtained, and the target image is determined from the candidate images according to the target text feature and the global image feature of the candidate image. In the preceding technical solutions, image and text retrieval is performed by the Vision and Scene Text Aggregation model having a dual encoding structure, that is, the text encoding network and the visual scene encoding network which are parallel to each other so that image and text retrieval efficiency is improved. Moreover, an aggregation feature is introduced so that a global image feature of an image can be effectively learned no matter whether a scene text is included, improving image and text retrieval accuracy.

Based on the preceding embodiment, as an optional manner of the present disclosure, the step in which the target text is inputted into the text encoding network so that the target text feature is obtained may include: performing word embedding on the target text to obtain a target text word vector; determining a word encoding result of the target text according to modal information of the target text, position encoding information of the target text, and the target text word vector; constructing an encoding sequence of the target text according to an initial target text feature and the word encoding result of the target text; and inputting the encoding sequence of the target text into the text encoding network to obtain a processed target text feature.

In the embodiment, the modal information of the target text is preset identification information for characterizing the text, a model, and has the same value as modal information of a sample text. The position encoding information of the target text is position identification information of a word belonging to the target text in the target text.

Specifically, the target text may be processed based on word embedding technology such that a vector of each word in the target text, the target text word vector, is obtained.

Then, for each word in the target text, the modal information of the target text, position encoding information of the word, and the target text word vector of the word may be spliced based on a certain rule such that an encoding result of the word is obtained.

After encoding results of words in the target text are determined, the encoding sequence of the target text may be constructed according to the initial target text feature and the encoding results of the words. The initial target text feature may be specifically composed of a text feature to be learned, the modal information of the target text, and the position encoding information of the target text. Optionally, the initial target text feature is located at a first position of the encoding sequence of the target text. After the encoding sequence of the target text is determined, the encoding sequence of the target text may be inputted into the text encoding network so that the target text feature is obtained.

It will be appreciated that the target text feature is determined in conjunction with the modal information of the target text, the position encoding information, and the target text word vector so that the finally determined target text feature is more accurate.

Based on the preceding embodiment, as an optional manner of the present disclosure, the step of inputting the candidate image into the visual encoding subnetwork may include: dividing the candidate image into blocks to obtain a candidate image block sequence; performing linear projection on a candidate image block in the candidate image block sequence to obtain an encoding result of the candidate image block; processing the encoding result of the candidate image block according to modal information of the candidate image block and position encoding information of the candidate image block to obtain the processed encoding result of the candidate image block; constructing an encoding sequence of the candidate image according to an initial global image feature and the processed encoding result of the candidate image block; and inputting the encoding sequence of the candidate image into the input layer in the visual encoding subnetwork.

In the embodiment, the modal information of the candidate image block is preset identification information for characterizing the image, a model, and has the same value as modal information of a sample image. The position encoding information of the candidate image block is identification information of the candidate image block.

Specifically, the candidate image may be divided according to a certain dimension into multiple (for example, N which is a positive integer) candidate image blocks of the same size so that the candidate image block sequence is obtained.

After the candidate image block sequence is obtained, for each candidate image block in the candidate image block sequence, the linear projection is performed on the candidate image block such that the encoding result of the candidate image block is obtained. Moreover, the encoding result of the candidate image block, the modal information of the candidate image block, and the position encoding information of the candidate image block may be spliced based on a certain rule such that the processed encoding result of the candidate image block is obtained.

After processed encoding results of candidate image blocks are determined, the encoding sequence of the candidate image may be constructed based on the initial global image feature and the processed encoding results of the candidate image blocks and inputted into the input layer in the visual encoding subnetwork. The initial global image feature may be specifically composed of image encoding to be learned, modal information of the candidate image blocks, and position encoding information of the candidate image blocks.

It will be appreciated that in the present disclosure, the encoding result of the candidate image block is determined in image division and linear projection manners, which reduces calculation complexity and improves efficiency compared with the acquisition of an encoding result of an image block in an image by a detector. Meanwhile, the encoding sequence of the candidate image is determined in conjunction with the modal information of the candidate image block, the position encoding information of the candidate image block, and the initial global image feature so that the visual encoding subnetwork can extract richer features of the candidate image.

Based on the preceding embodiment, as an optional manner of the present disclosure, the step of inputting the candidate scene text into the scene encoding subnetwork may include: performing the word embedding on the candidate scene text to obtain a candidate scene text vector; determining an encoding result of the candidate scene text according to image position encoding information of the candidate scene text, modal information of the candidate scene text, character position encoding information of the candidate scene text, and the candidate scene text vector; constructing an encoding sequence of the candidate scene text according to an initial candidate scene text feature and the encoding result of the candidate scene text; and inputting the encoding sequence of the candidate scene text into the input layer in the scene encoding subnetwork.

In the embodiment, the modal information of the candidate scene text is preset identification information for characterizing the scene text, a model, and has the same value as modal information of a sample scene text. The character position encoding information of the candidate scene text is used for uniquely identifying an order of characters in the candidate scene text. The image position encoding information of the candidate scene text is used for uniquely identifying image position information of the candidate scene text in the candidate image.

Specifically, for each candidate scene text extracted from the candidate image, the candidate scene text may be processed based on the word embedding technology such that the candidate scene text vector of the candidate scene text is obtained. Moreover, the image position encoding information of the candidate scene text, the modal information of the candidate scene text, the character position encoding information of the candidate scene text, and the candidate scene text vector may be spliced based on a certain rule such that the encoding result of the candidate scene text is obtained. An encoding sequence of candidate scene texts may be constructed according to the initial candidate scene text feature and encoding results of the candidate scene texts. The initial candidate scene text feature may be specifically composed of a scene text feature to be learned, the modal information of the candidate scene text, and the image position encoding information and the character position encoding information of the candidate scene text.

It will be appreciated that the encoding sequence of the candidate scene text is determined in conjunction with the image position encoding information of the candidate scene text, the modal information of the candidate scene text, the character position encoding information of the candidate scene text, and an initial candidate scene text feature so that the scene encoding subnetwork can extract richer features of the candidate scene text.

Figure 5:
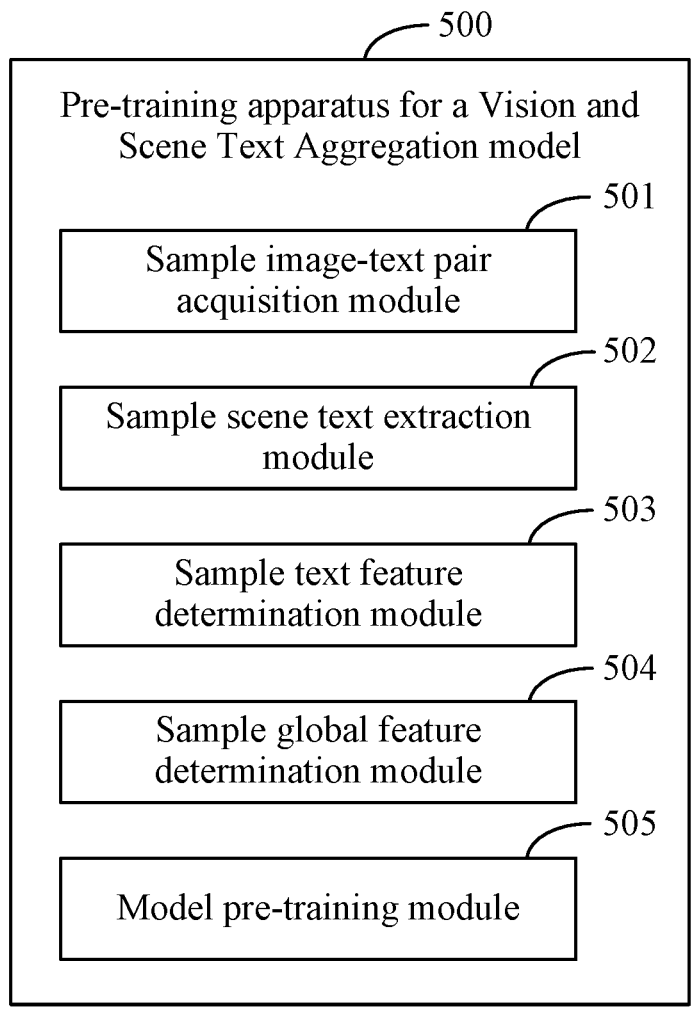
FIG. 5 is a structural diagram of a pre-training apparatus for a Vision and Scene Text Aggregation model according to an embodiment of the present disclosure.

FIG. 5 is a structural diagram of a pre-training apparatus for a Vision and Scene Text Aggregation model according to an embodiment of the present disclosure. The embodiment is applicable to the case where the Vision and Scene Text Aggregation model is pre-trained. The apparatus may be implemented by software and/or hardware and may be integrated into an electronic device carrying a Vision and Scene Text Aggregation model pre-training function. Optionally, the Vision and Scene Text Aggregation model includes a text encoding network and a visual scene encoding network, and the visual scene encoding network includes a visual encoding subnetwork and a scene encoding subnetwork. As shown in FIG. 5, a pre-training apparatus 500 for the Vision and Scene Text Aggregation model in the embodiment may include a sample image-text pair acquisition module 501, a sample scene text extraction module 502, a sample text feature determination module 503, a sample global feature determination module 504, and a model pre-training module 505.

The sample image-text pair acquisition module 501 is configured to acquire a sample image-text pair, where the sample image-text pair includes a sample image and a sample text.

The sample scene text extraction module 502 is configured to extract a sample scene text from the sample image.

The sample text feature determination module 503 is configured to input the sample text into the text encoding network to obtain a sample text feature.

The sample global feature determination module 504 is configured to input the sample image and an initial sample aggregation feature into the visual encoding subnetwork and input the initial sample aggregation feature and the sample scene text into the scene encoding subnetwork to obtain a global image feature of the sample image and a learned sample aggregation feature.

The model pre-training module 505 is configured to pre-train the Vision and Scene Text Aggregation model according to the sample text feature, the global image feature of the sample image, and the learned sample aggregation feature.

According to the technical solutions in the embodiment of the present disclosure, the sample text in the sample image-text pair is inputted into the text encoding network so that the sample text feature is obtained; the sample image in the sample image-text pair and the initial sample aggregation feature are inputted into the visual encoding subnetwork and the initial sample aggregation feature and the sample scene text extracted from the sample image are inputted into the scene encoding subnetwork so that the global image feature of the sample image and the learned sample aggregation feature are obtained; and the Vision and Scene Text Aggregation model is pre-trained according to the sample text feature, the global image feature of the sample image, and the learned sample aggregation feature. In the preceding technical solutions, the sample aggregation feature, the global image feature of the sample image, and the sample text feature are introduced for pre-training the Vision and Scene Text Aggregation model so that no matter whether an input image includes a scene text, the global image feature of the image can be accurately outputted and the Vision and Scene Text Aggregation model can support a retrieval task within a large range of image and text sets. That is to say, the Vision and Scene Text Aggregation model is applicable to not only cross-modal retrieval in the presence of the scene text but also cross-modal retrieval in the absence of the scene text. Additionally, in the solutions, images and texts are processed in parallel through a dual encoding structure, that is, the text encoding network and the visual scene encoding network which are parallel to each other so that cross-modal retrieval efficiency can be improved.

Further, the sample global feature determination module 504 is configured to input the sample image into an input layer in the visual encoding subnetwork and input the initial sample aggregation feature into an aggregation layer in the visual encoding subnetwork to obtain the global image feature of the sample image outputted from the visual encoding subnetwork and a visual aggregation feature outputted from the visual encoding subnetwork; input the sample scene text into an input layer in the scene encoding subnetwork and input the initial sample aggregation feature into an aggregation layer in the scene encoding subnetwork to obtain a scene aggregation feature outputted from the scene encoding subnetwork; and aggregate the visual aggregation feature outputted from the visual encoding subnetwork with the scene aggregation feature outputted from the scene encoding subnetwork to obtain the learned sample aggregation feature.

Further, the sample text feature determination module 503 is configured to perform word embedding on the sample text to obtain a sample text word vector; determine a word encoding result of the sample text according to modal information of the sample text, position encoding information of the sample text, and the sample text word vector; construct an encoding sequence of the sample text according to an initial sample text feature and the word encoding result of the sample text; and input the encoding sequence of the sample text into the text encoding network to obtain a learned sample text feature.

Further, the sample global feature determination module 504 is configured to divide the sample image into blocks to obtain a sample image block sequence; perform linear projection on a sample image block in the sample image block sequence to obtain an encoding result of the sample image block; process the encoding result of the sample image block according to modal information of the sample image block and position encoding information of the sample image block to obtain the processed encoding result of the sample image block; construct an encoding sequence of the sample image according to an initial global image feature and the processed encoding result of the sample image block; and input the encoding sequence of the sample image into the input layer in the visual encoding subnetwork.

Further, the sample global feature determination module 504 is configured to perform the word embedding on the sample scene text to obtain a sample scene text vector; determine an encoding result of the sample scene text according to image position encoding information of the sample scene text, modal information of the sample scene text, character position encoding information of the sample scene text, and the sample scene text vector; construct an encoding sequence of the sample scene text according to an initial sample scene text feature and the encoding result of the sample scene text; and input the encoding sequence of the sample scene text into the input layer in the scene encoding subnetwork.

Further, the model pre-training module 505 includes an aggregation contrast loss unit, an image text contrast loss unit, a training loss unit, and a model pre-training unit.

The aggregation contrast loss unit is configured to determine an aggregation text contrast loss according to the sample text feature and the learned sample aggregation feature.

The image text contrast loss unit is configured to determine an image text contrast loss according to the global image feature of the sample image and the learned sample text feature.

The training loss unit is configured to determine a training loss according to the aggregation text contrast loss and the image text contrast loss.

The model pre-training unit is configured to pre-train the Vision and Scene Text Aggregation model by using the training loss.

Further, the training loss unit is configured to determine whether the sample scene text is an empty text or a non-empty text; in the case where the sample scene text is the empty text, use the image text contrast loss as the training loss; in the case where the sample scene text is the non-empty text, use a sum of the aggregation text contrast loss and the image text contrast loss as the training loss.

Figure 6:
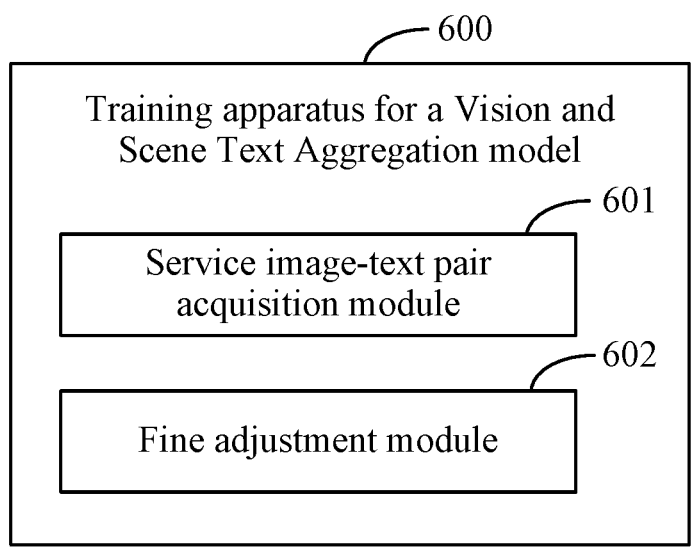
FIG. 6 is a structural diagram of a training apparatus for a Vision and Scene Text Aggregation model according to an embodiment of the present disclosure.

FIG. 6 is a structural diagram of a training apparatus for a Vision and Scene Text Aggregation model according to an embodiment of the present disclosure. The apparatus may be implemented by software and/or hardware and may be integrated into an electronic device carrying a Vision and Scene Text Aggregation model training function. As shown in FIG. 6, a training apparatus 600 for the Vision and Scene Text Aggregation model in the embodiment may include a service image-text pair acquisition module 601 and a fine adjustment module 602.

The service image-text pair acquisition module 601 is configured to acquire a service image-text pair provided by a service party, where the service image-text pair includes a service image and a service text.

The fine adjustment module 602 is configured to finely adjust the Vision and Scene Text Aggregation model by using the service image and the service text as training data, where the Vision and Scene Text Aggregation model is obtained based on any pre-training method for the Vision and Scene Text Aggregation model in the present disclosure.

According to the technical solution in the embodiment, the pre-trained Vision and Scene Text Aggregation model is finely adjusted so that the Vision and Scene Text Aggregation model is more applicable to an actual service scenario.

Figure 7:
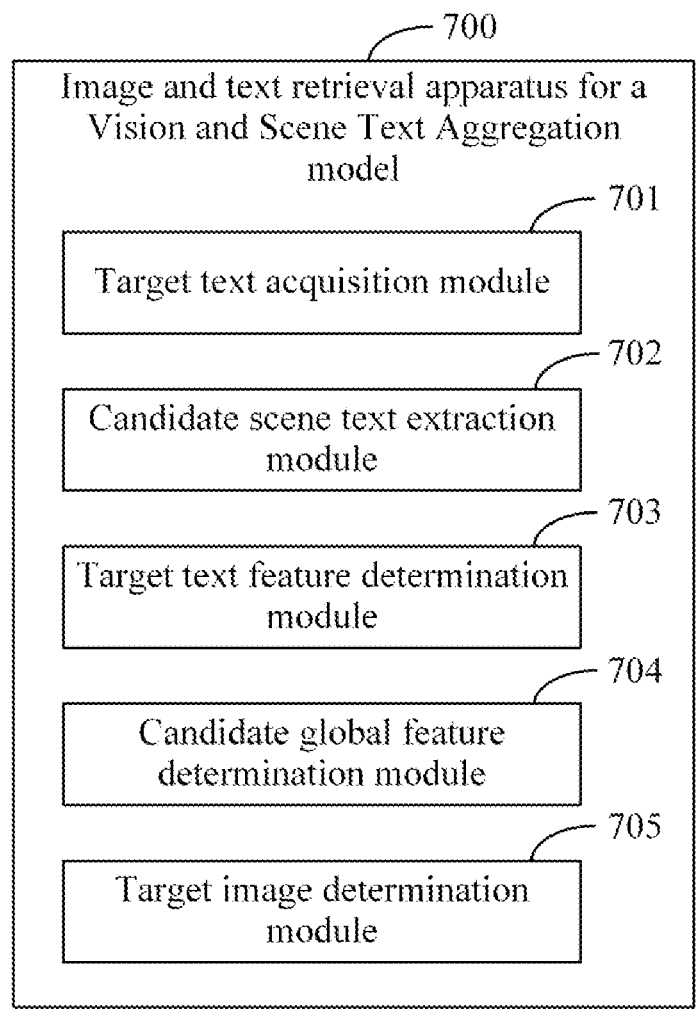
FIG. 7 is a structural diagram of an image and text retrieval apparatus for a Vision and Scene Text Aggregation model according to an embodiment of the present disclosure.

FIG. 7 is a structural diagram of an image and text retrieval apparatus for a Vision and Scene Text Aggregation model according to an embodiment of the present disclosure. The embodiment is applicable to image and text retrieval. The apparatus may be implemented by software and/or hardware and may be integrated into an electronic device carrying an image and text retrieval function. The Vision and Scene Text Aggregation model includes a text encoding network and a visual scene encoding network, and the visual scene encoding network includes a visual encoding subnetwork and a scene encoding subnetwork. As shown in FIG. 7, an image and text retrieval apparatus 700 for the Vision and Scene Text Aggregation model in the embodiment may include a target text acquisition module 701, a candidate scene text extraction module 702, a target text feature determination module 703, a candidate global feature determination module 704, and a target image determination module 705.

The target text acquisition module 701 is configured to acquire a target text for retrieval.

The candidate scene text extraction module 702 is configured to extract a candidate scene text from a candidate image of candidate images.

The target text feature determination module 703 is configured to input the target text into the text encoding network to obtain a target text feature.

The candidate global feature determination module 704 is configured to input the candidate image and an initial candidate aggregation feature into the visual encoding subnetwork and input the initial candidate aggregation feature and the candidate scene text into the scene encoding subnetwork to obtain a global image feature of the candidate image.

The target image determination module 705 is configured to determine a target image from the candidate images according to the target text feature and the global image feature of the candidate image.

According to the technical solutions in the embodiment of the present disclosure, the candidate scene text is extracted from the candidate image, the acquired target text is inputted into the text encoding network so that the target text feature is obtained, the candidate image and the initial candidate aggregation feature are inputted into the visual encoding subnetwork and the initial candidate aggregation feature and the candidate scene text are inputted into the scene encoding subnetwork so that the global image feature of the candidate image is obtained, and the target image is determined from the candidate images according to the target text feature and the global image feature of the candidate image. In the preceding technical solutions, image and text retrieval is performed by the Vision and Scene Text Aggregation model having a dual encoding structure, that is, the text encoding network and the visual scene encoding network which are parallel to each other so that image and text retrieval efficiency is improved. Moreover, the candidate aggregation feature is introduced so that the global image feature of the candidate image can be effectively learned no matter whether a scene text is included, improving image and text retrieval accuracy.

Further, the target text feature determination module 703 is configured to perform word embedding on the target text to obtain a target text word vector; determine a word encoding result of the target text according to modal information of the target text, position encoding information of the target text, and the target text word vector; construct an encoding sequence of the target text according to an initial target text feature and the word encoding result of the target text; and input the encoding sequence of the target text into the text encoding network to obtain a processed target text feature.

Further, the candidate global feature determination module 704 is configured to divide the candidate image into blocks to obtain a candidate image block sequence; perform linear projection on a candidate image block in the candidate image block sequence to obtain an encoding result of the candidate image block; process the encoding result of the candidate image block according to modal information of the candidate image block and position encoding information of the candidate image block to determine the processed encoding result of the candidate image block; construct an encoding sequence of the candidate image according to an initial global image feature and the processed encoding result of the candidate image block; and input the encoding sequence of the candidate image into an input layer in the visual encoding subnetwork.

Further, the candidate global feature determination module 704 is further configured to perform the word embedding on the candidate scene text to obtain a candidate scene text vector; determine an encoding result of the candidate scene text according to image position encoding information of the candidate scene text, modal information of the candidate scene text, character position encoding information of the candidate scene text, and the candidate scene text vector; construct an encoding sequence of the candidate scene text according to an initial candidate scene text feature and the encoding result of the candidate scene text; and input the encoding sequence of the candidate scene text into an input layer in the scene encoding subnetwork.

Further, the Vision and Scene Text Aggregation model is obtained based on any training apparatus for the Vision and Scene Text Aggregation model in the present disclosure.

Operations, including acquisition, storage, use, processing, transmission, provision, and disclosure, on the sample image-text pair, the target text, and the candidate image involved in the technical solutions of the present disclosure conform to relevant laws and regulations and do not violate the public policy doctrine.

According to embodiments of the present disclosure, the present disclosure further provides an electronic device, a readable storage medium, and a computer program product.

Figure 8:
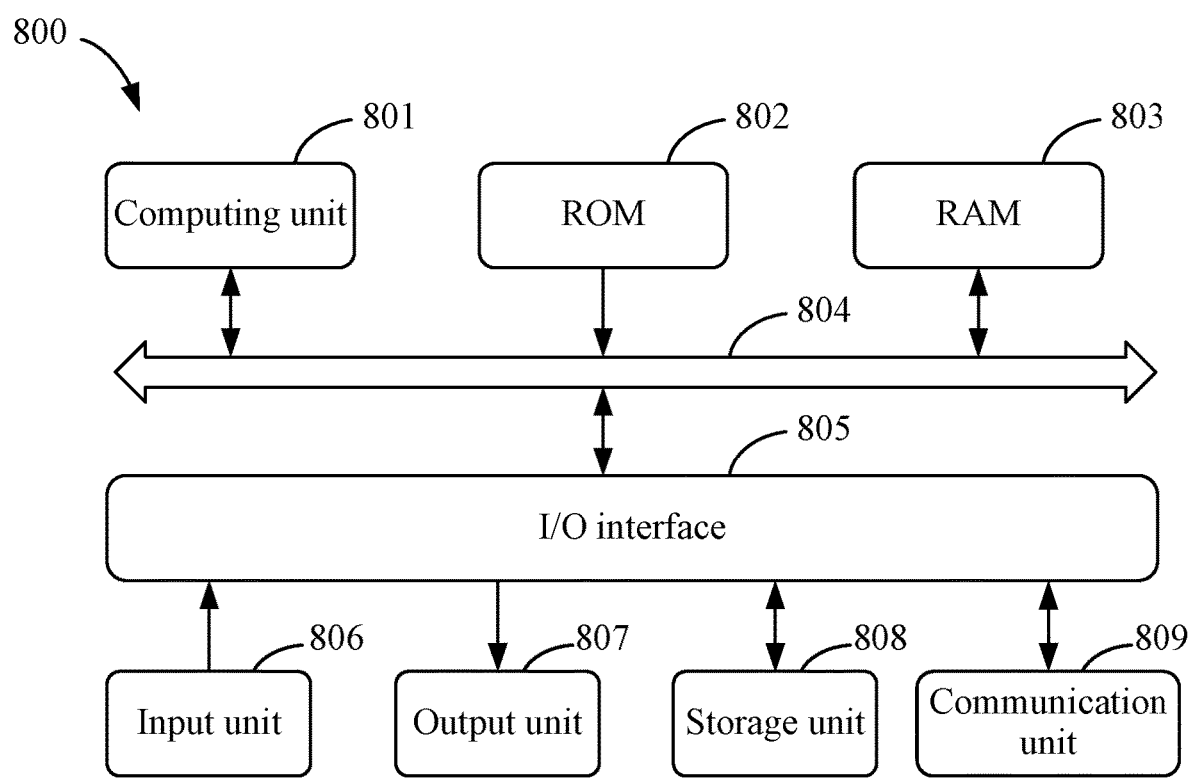
FIG. 8 is a block diagram of an electronic device for implementing a pre-training method, a training method, or an image and text retrieval method for a Vision and Scene Text Aggregation model according to an embodiment of the present disclosure.

FIG. 8 is a block diagram of an electronic device for implementing a pre-training method, a training method, or an image and text retrieval method for a Vision and Scene Text Aggregation model according to an embodiment of the present disclosure. FIG. 8 is a block diagram illustrative of an exemplary electronic device 800 that may be configured to implement embodiments of the present disclosure. The electronic device is intended to represent various forms of digital computers, for example, laptop computers, desktop computers, worktables, personal digital assistants, servers, blade servers, mainframe computers, and other applicable computers. The electronic device may also represent various forms of mobile devices, for example, personal digital assistants, cellphones, smartphones, wearable devices, and other similar computing devices. Herein the shown components, the connections and relationships between these components, and the functions of these components are illustrative only and are not intended to limit the implementation of the present disclosure as described and/or claimed herein.

As shown in FIG. 8, the electronic device 800 includes a computing unit 801. The computing unit 801 may perform various appropriate actions and processing according to a computer program stored in a read-only memory (ROM) 802 or a computer program loaded into a random-access memory (RAM) 803 from a storage unit 808. Various programs and data required for operations of the electronic device 800 may also be stored in the RAM 803. The computing unit 801, the ROM 802, and the RAM 803 are connected to each other through a bus 804. An input/output (I/O) interface 805 is also connected to the bus 804.

Multiple components in the electronic device 800 are connected to the I/O interface 805. The multiple components include an input unit 806 such as a keyboard and a mouse, an output unit 807 such as various types of display and speaker, the storage unit 808 such as a magnetic disk and an optical disk, and a communication unit 809 such as a network card, a modem, and a wireless communication transceiver. The communication unit 809 allows the electronic device 800 to exchange information/data with other devices over a computer network such as the Internet and/or over various telecommunication networks.

The computing unit 801 may be various general-purpose and/or special-purpose processing components having processing and computing capabilities. Examples of the computing unit 801 include, but are not limited to, a central processing unit (CPU), a graphics processing unit (GPU), a special-purpose artificial intelligence (AI) computing chip, a computing unit executing machine learning model algorithms, a digital signal processor (DSP), and any appropriate processor, controller, and microcontroller. The computing unit 801 performs the preceding methods and processing, such as the pre-training method, the training method, or the image and text retrieval method for the Vision and Scene Text Aggregation model. For example, in some embodiments, the pre-training method, the training method, or the image and text retrieval method for the Vision and Scene Text Aggregation model may be implemented as a computer software program tangibly included in a machine-readable medium such as the storage unit 808. In some embodiments, part or all of a computer program may be loaded and/or installed on the electronic device 800 via the ROM 802 and/or the communication unit 809. When the computer program is loaded onto the RAM 803 and executed by the computing unit 801, one or more steps of the preceding pre-training method, training method, or image and text retrieval method for the Vision and Scene Text Aggregation model may be performed. Alternatively, in other embodiments, the computing unit 801 may be configured, in any other appropriate manner (for example, by means of firmware), to perform the pre-training method, the training method, or the image and text retrieval method for the Vision and Scene Text Aggregation model.

Herein various implementations of the systems and techniques described above may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software, and/or combinations thereof. The various implementations may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input device, and at least one output device and transmitting data and instructions to the memory system, the at least one input device, and the at least one output device.

Program codes for implementation of the methods of the present disclosure may be written in any combination of one or more programming languages. These program codes may be provided for the processor or controller of a general-purpose computer, a special-purpose computer, or another programmable data processing device to enable functions/operations specified in flowcharts and/or block diagrams to be implemented when the program codes are executed by the processor or controller. The program codes may all be executed on a machine; may be partially executed on a machine; may serve as a separate software package that is partially executed on a machine and partially executed on a remote machine; or may all be executed on a remote machine or a server.

In the context of the present disclosure, the machine-readable medium may be a tangible medium that may include or store a program available for an instruction execution system, apparatus, or device or a program used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device or any appropriate combination thereof. Concrete examples of the machine-readable storage medium include an electrical connection based on one or more wires, a portable computer disk, a hard disk, a RAM, a ROM, an erasable programmable read-only memory (EPROM) or a flash memory, an optical fiber, a portable compact disc read-only memory (CD-ROM), an optical storage device, a magnetic storage device, or any appropriate combination thereof.

In order that interaction with a user is provided, the systems and techniques described herein may be implemented on a computer. The computer has a display device (for example, a cathode-ray tube (CRT) or a liquid-crystal display (LCD) monitor) for displaying information to the user; and a keyboard and a pointing device (for example, a mouse or a trackball) through which the user can provide input for the computer. Other types of devices may also be used for providing interaction with a user. For example, feedback provided for the user may be sensory feedback in any form (for example, visual feedback, auditory feedback, or haptic feedback). Moreover, input from the user may be received in any form (including acoustic input, voice input, or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein), or a computing system including any combination of such back-end, middleware, or front-end components. Components of a system may be interconnected by any form or medium of digital data communication (for example, a communication network). Examples of the communication network include a local area network (LAN), a wide area network (WAN), and the Internet.

A computer system may include clients and servers. A client and a server are generally remote from each other and typically interact through a communication network. The relationship between the client and the server arises by virtue of computer programs running on respective computers and having a client-server relationship to each other. The server may be a cloud server, a server of a distributed system, or a server combined with a blockchain.

Artificial intelligence is a discipline studying the simulation of certain human thinking processes and intelligent behaviors (such as learning, reasoning, thinking, and planning) by a computer and involves techniques at both hardware and software levels. Hardware techniques of artificial intelligence generally include techniques such as sensors, special-purpose artificial intelligence chips, cloud computing, distributed storage, and big data processing. Software techniques of artificial intelligence mainly include several major directions such as computer vision technology, speech recognition technology, natural language processing technology, machine learning/deep learning technology, big data processing technology, and knowledge graph technology.

Cloud computing refers to a technical system that accesses a shared elastic-and-scalable physical or virtual resource pool through a network and can deploy and manage resources in an on-demand self-service manner, where the resources may include servers, operating systems, networks, software, applications, storage devices, and the like. Cloud computing can provide efficient and powerful data processing capabilities for model training and technical applications such as artificial intelligence and blockchains.

It is to be understood that various forms of the preceding flows may be used, with steps reordered, added, or removed. For example, steps described in the present disclosure may be executed in parallel, in sequence, or in a different order as long as the desired results of the technical solutions disclosed in the present disclosure are achieved. The execution sequence of the steps is not limited herein.

The scope of the present disclosure is not limited to the preceding embodiments. It is to be understood by those skilled in the art that various modifications, combinations, subcombinations, and substitutions may be made according to design requirements and other factors. Any modifications, equivalent substitutions, improvements, and the like made within the spirit and principle of the present disclosure fall within the scope of the present disclosure.

What is claimed is:

1. A pre-training method for a Vision and Scene Text Aggregation model, wherein the Vision and Scene Text Aggregation model comprises a text encoding network and a visual scene encoding network, the visual scene encoding network comprises a visual encoding subnetwork and a scene encoding subnetwork, and the method comprises:
    acquiring a sample image-text pair, wherein the sample image-text pair comprises a sample image and a sample text;
    extracting a sample scene text from the sample image;
    inputting the sample text into the text encoding network to obtain a sample text feature;
    inputting the sample image and an initial sample aggregation feature into the visual encoding subnetwork and inputting the initial sample aggregation feature and the sample scene text into the scene encoding subnetwork to obtain a global image feature of the sample image and a learned sample aggregation feature; and
    pre-training the Vision and Scene Text Aggregation model according to the sample text feature, the global image feature of the sample image, and the learned sample aggregation feature.

2. The method of claim 1, wherein inputting the sample image and the initial sample aggregation feature into the visual encoding subnetwork and inputting the initial sample aggregation feature and the sample scene text into the scene encoding subnetwork to obtain the global image feature of the sample image and the learned sample aggregation feature comprise:
    inputting the sample image into an input layer in the visual encoding subnetwork and inputting the initial sample aggregation feature into an aggregation layer in the visual encoding subnetwork to obtain the global image feature of the sample image outputted from the visual encoding subnetwork and a visual aggregation feature outputted from the visual encoding subnetwork;
    inputting the sample scene text into an input layer in the scene encoding subnetwork and inputting the initial sample aggregation feature into an aggregation layer in the scene encoding subnetwork to obtain a scene aggregation feature outputted from the scene encoding subnetwork; and
    aggregating the visual aggregation feature outputted from the visual encoding subnetwork with the scene aggregation feature outputted from the scene encoding subnetwork to obtain the learned sample aggregation feature.

3. The method of claim 1, wherein inputting the sample text into the text encoding network to obtain the sample text feature comprises:
    performing word embedding on the sample text to obtain a sample text word vector;
    determining a word encoding result of the sample text according to modal information of the sample text, position encoding information of the sample text, and the sample text word vector;
    constructing an encoding sequence of the sample text according to an initial sample text feature and the word encoding result of the sample text; and
    inputting the encoding sequence of the sample text into the text encoding network to obtain a learned sample text feature.

4. The method of claim 1, wherein inputting the sample image into the visual encoding subnetwork comprises:
    dividing the sample image into blocks to obtain a sample image block sequence;
    performing linear projection on a sample image block in the sample image block sequence to obtain an encoding result of the sample image block;
    processing the encoding result of the sample image block according to modal information of the sample image block and position encoding information of the sample image block to obtain the processed encoding result of the sample image block;
    constructing an encoding sequence of the sample image according to an initial global image feature and the processed encoding result of the sample image block; and
    inputting the encoding sequence of the sample image into an input layer in the visual encoding subnetwork.

5. The method of claim 1, wherein inputting the sample scene text into the scene encoding subnetwork comprises:
    performing word embedding on the sample scene text to obtain a sample scene text vector;
    determining an encoding result of the sample scene text according to image position encoding information of the sample scene text, modal information of the sample scene text, character position encoding information of the sample scene text, and the sample scene text vector;
    constructing an encoding sequence of the sample scene text according to an initial sample scene text feature and the encoding result of the sample scene text; and
    inputting the encoding sequence of the sample scene text into an input layer in the scene encoding subnetwork.

6. The method of claim 1, wherein pre-training the Vision and Scene Text Aggregation model according to the sample text feature, the global image feature of the sample image, and the learned sample aggregation feature comprises:
    determining an aggregation text contrast loss according to the sample text feature and the learned sample aggregation feature;
    determining an image text contrast loss according to the global image feature of the sample image and the sample text feature;
    determining a training loss according to the aggregation text contrast loss and the image text contrast loss; and
    pre-training the Vision and Scene Text Aggregation model by using the training loss.

7. The method of claim 6, wherein determining the training loss according to the aggregation text contrast loss and the image text contrast loss comprises:
    determining whether the sample scene text is an empty text or a non-empty text; and in a case where the sample scene text is the empty text, using the image text contrast loss as the training loss; and in a case where the sample scene text is the non-empty text, using a sum of the aggregation text contrast loss and the image text contrast loss as the training loss.

8. An electronic device, comprising:
at least one processor; and
a memory communicatively connected to the at least one processor;
wherein the memory stores an instruction executable by the at least one processor to enable the at least one processor to perform the method of claim 1.

9. A non-transitory computer-readable storage medium, which is configured to store a computer instruction for causing a computer to perform the method of claim 1.

10. A training method for a Vision and Scene Text Aggregation model, comprising:
acquiring a service image-text pair provided by a service party, wherein the service image-text pair comprises a service image and a service text; and
finely adjusting the Vision and Scene Text Aggregation model by using the service image and the service text as training data, wherein the Vision and Scene Text Aggregation model is obtained based on a pre-training method for a Vision and Scene Text Aggregation model, wherein the Vision and Scene Text Aggregation model comprises a text encoding network and a visual scene encoding network, the visual scene encoding network comprises a visual encoding subnetwork and a scene encoding subnetwork, and the pre-training method comprises:
acquiring a sample image-text pair, wherein the sample image-text pair comprises a sample image and a sample text;
extracting a sample scene text from the sample image;
inputting the sample text into the text encoding network to obtain a sample text feature;
inputting the sample image and an initial sample aggregation feature into the visual encoding subnetwork and inputting the initial sample aggregation feature and the sample scene text into the scene encoding subnetwork to obtain a global image feature of the sample image and a learned sample aggregation feature; and
pre-training the Vision and Scene Text Aggregation model according to the sample text feature, the global image feature of the sample image, and the learned sample aggregation feature.

11. An electronic device, comprising:
at least one processor; and
a memory communicatively connected to the at least one processor;
wherein the memory stores an instruction executable by the at least one processor to enable the at least one processor to perform the method of claim 10.

12. A non-transitory computer-readable storage medium, which is configured to store a computer instruction for causing a computer to perform the method of claim 10.

13. An image and text retrieval method for a Vision and Scene Text Aggregation model, wherein the Vision and Scene Text Aggregation model comprises a text encoding network and a visual scene encoding network, the visual scene encoding network comprises a visual encoding subnetwork and a scene encoding subnetwork, and the method comprises:

acquiring a target text for retrieval;
extracting a candidate scene text from a candidate image of candidate images;
inputting the target text into the text encoding network to obtain a target text feature;
inputting the candidate image and an initial candidate aggregation feature into the visual encoding subnetwork and inputting the initial candidate aggregation feature and the candidate scene text into the scene encoding subnetwork to obtain a global image feature of the candidate image; and
determining a target image from the candidate images according to the target text feature and the global image feature of the candidate image.

14. The method of claim 13, wherein inputting the target text into the text encoding network to obtain the target text feature comprises:
performing word embedding on the target text to obtain a target text word vector;
determining a word encoding result of the target text according to modal information of the target text, position encoding information of the target text, and the target text word vector;
constructing an encoding sequence of the target text according to an initial target text feature and the word encoding result of the target text; and
inputting the encoding sequence of the target text into the text encoding network to obtain a processed target text feature.

15. The method of claim 13, wherein inputting the candidate image into the visual encoding subnetwork comprises:
dividing the candidate image into blocks to obtain a candidate image block sequence;
performing linear projection on a candidate image block in the candidate image block sequence to obtain an encoding result of the candidate image block;
processing the encoding result of the candidate image block according to modal information of the candidate image block and position encoding information of the candidate image block to determine the processed encoding result of the candidate image block;
constructing an encoding sequence of the candidate image according to an initial global image feature and the processed encoding result of the candidate image block; and
inputting the encoding sequence of the candidate image into an input layer in the visual encoding subnetwork.

16. The method of claim 13, wherein inputting the candidate scene text into the scene encoding subnetwork comprises:
performing word embedding on the candidate scene text to obtain a candidate scene text vector;
determining an encoding result of the candidate scene text according to image position encoding information of the candidate scene text, modal information of the candidate scene text, character position encoding information of the candidate scene text, and the candidate scene text vector;
constructing an encoding sequence of the candidate scene text according to an initial candidate scene text feature and the encoding result of the candidate scene text; and
inputting the encoding sequence of the candidate scene text into an input layer in the scene encoding subnetwork.

17. The method of claim 13, wherein the Vision and Scene Text Aggregation model is obtained based on a training method for the Vision and Scene Text Aggregation model comprising:
acquiring a service image-text pair provided by a service party, wherein the service image-text pair comprises a service image and a service text; and
finely adjusting the Vision and Scene Text Aggregation model by using the service image and the service text as training data, wherein the Vision and Scene Text Aggregation model is obtained based on a pre-training method for a Vision and Scene Text Aggregation model, wherein the Vision and Scene Text Aggregation model comprises a text encoding network and a visual scene encoding network, the visual scene encoding network comprises a visual encoding subnetwork and a scene encoding subnetwork, and the pre-training method comprises:
acquiring a sample image-text pair, wherein the sample image-text pair comprises a sample image and a sample text;
extracting a sample scene text from the sample image;
inputting the sample text into the text encoding network to obtain a sample text feature;
inputting the sample image and an initial sample aggregation feature into the visual encoding subnetwork and inputting the initial sample aggregation feature and the sample scene text into the scene encoding subnetwork to obtain a global image feature of the sample image and a learned sample aggregation feature; and
pre-training the Vision and Scene Text Aggregation model according to the sample text feature, the global image feature of the sample image, and the learned sample aggregation feature.

18. An electronic device, comprising:
at least one processor; and
a memory communicatively connected to the at least one processor;
wherein the memory stores an instruction executable by the at least one processor to enable the at least one processor to perform the method of claim 13.

19. A non-transitory computer-readable storage medium, which is configured to store a computer instruction for causing a computer to perform the method of claim 13.

* * * * *